April 17, 1934.  J. COYLE  1,955,671
MACHINE FOR CUTTING CAN BODY BLANKS FROM METAL SHEETS
Filed July 26, 1932   15 Sheets-Sheet 3
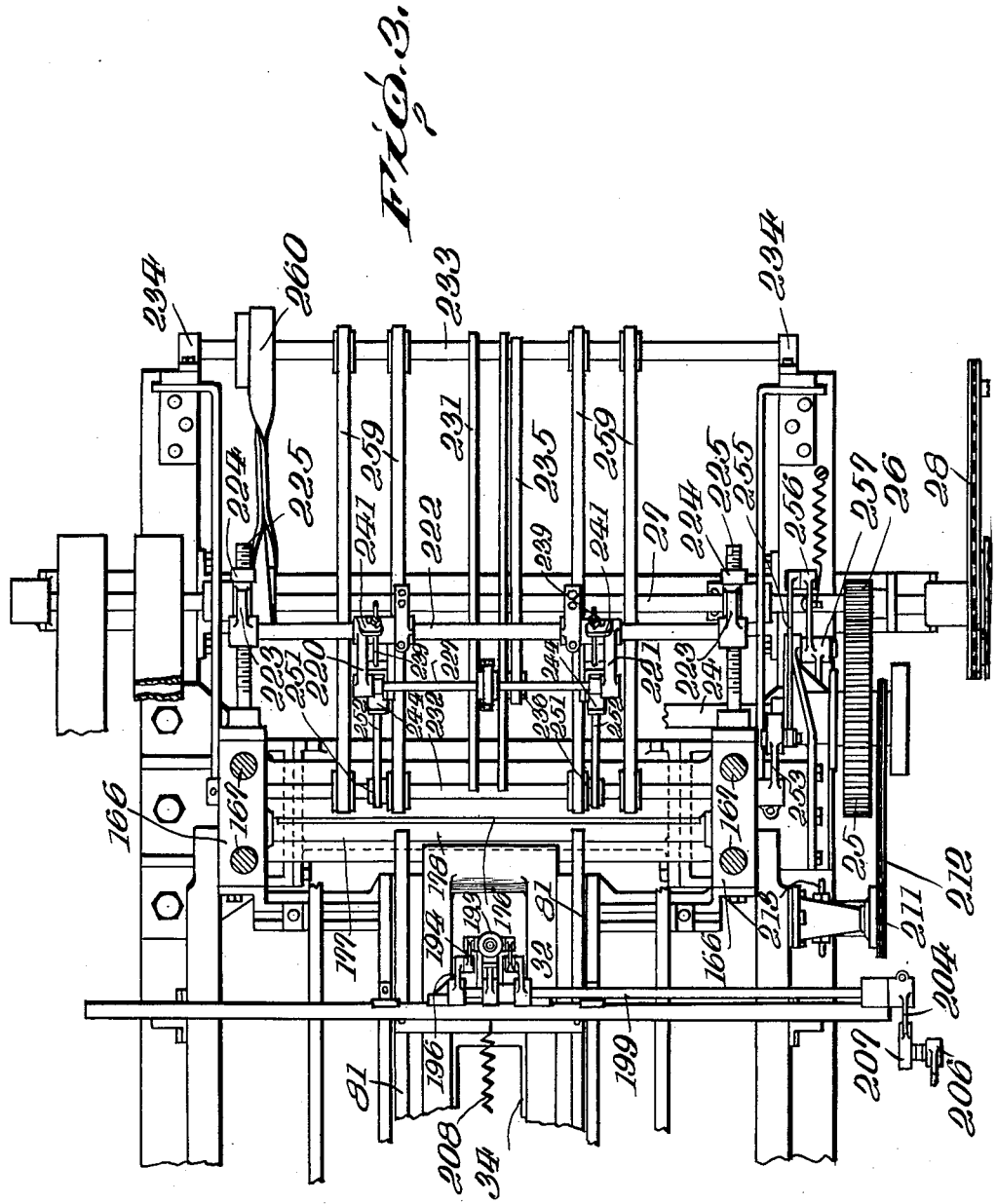
Inventor
John Coyle
By Sturtevant, Mason & Porter
Attorneys

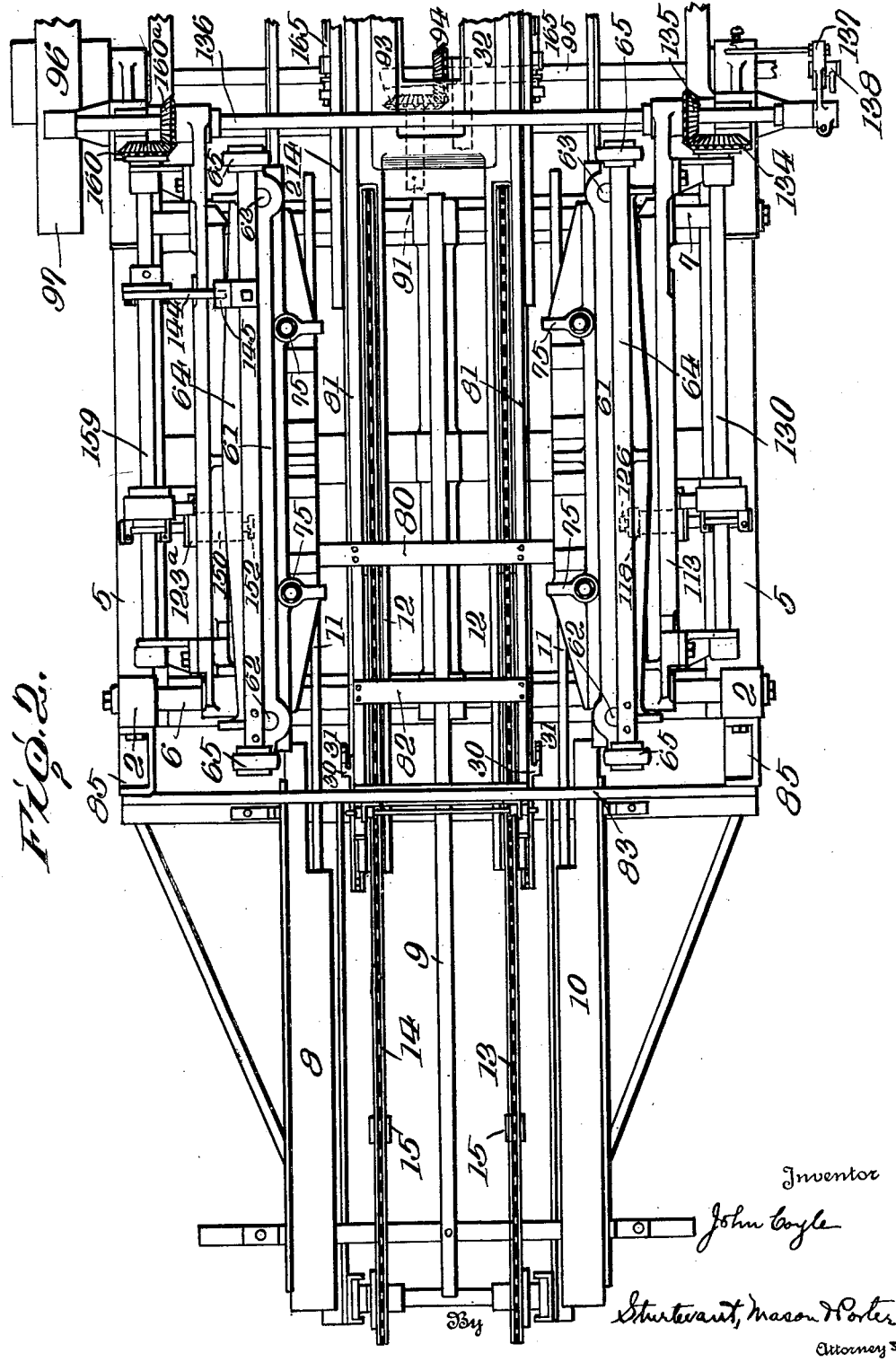

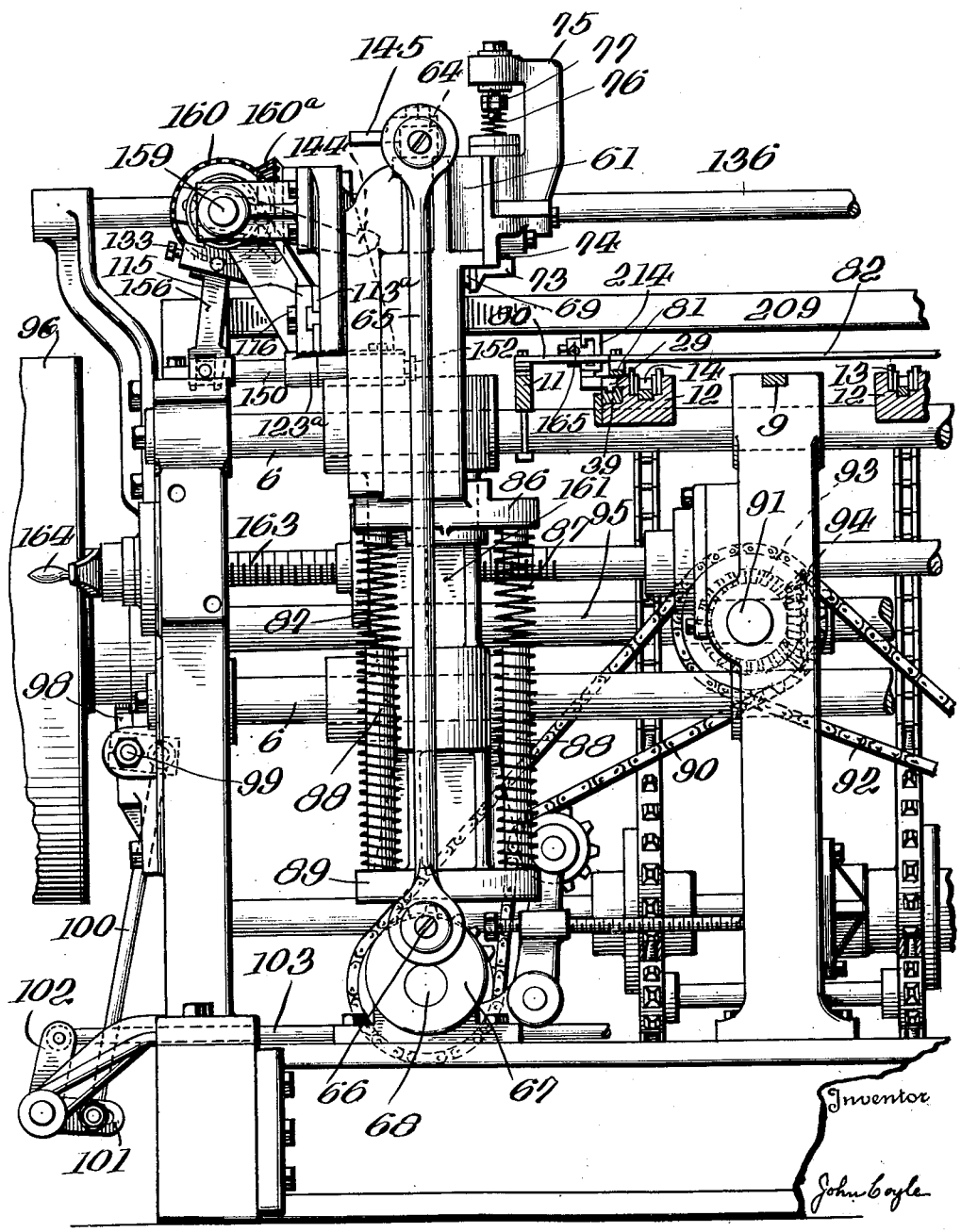

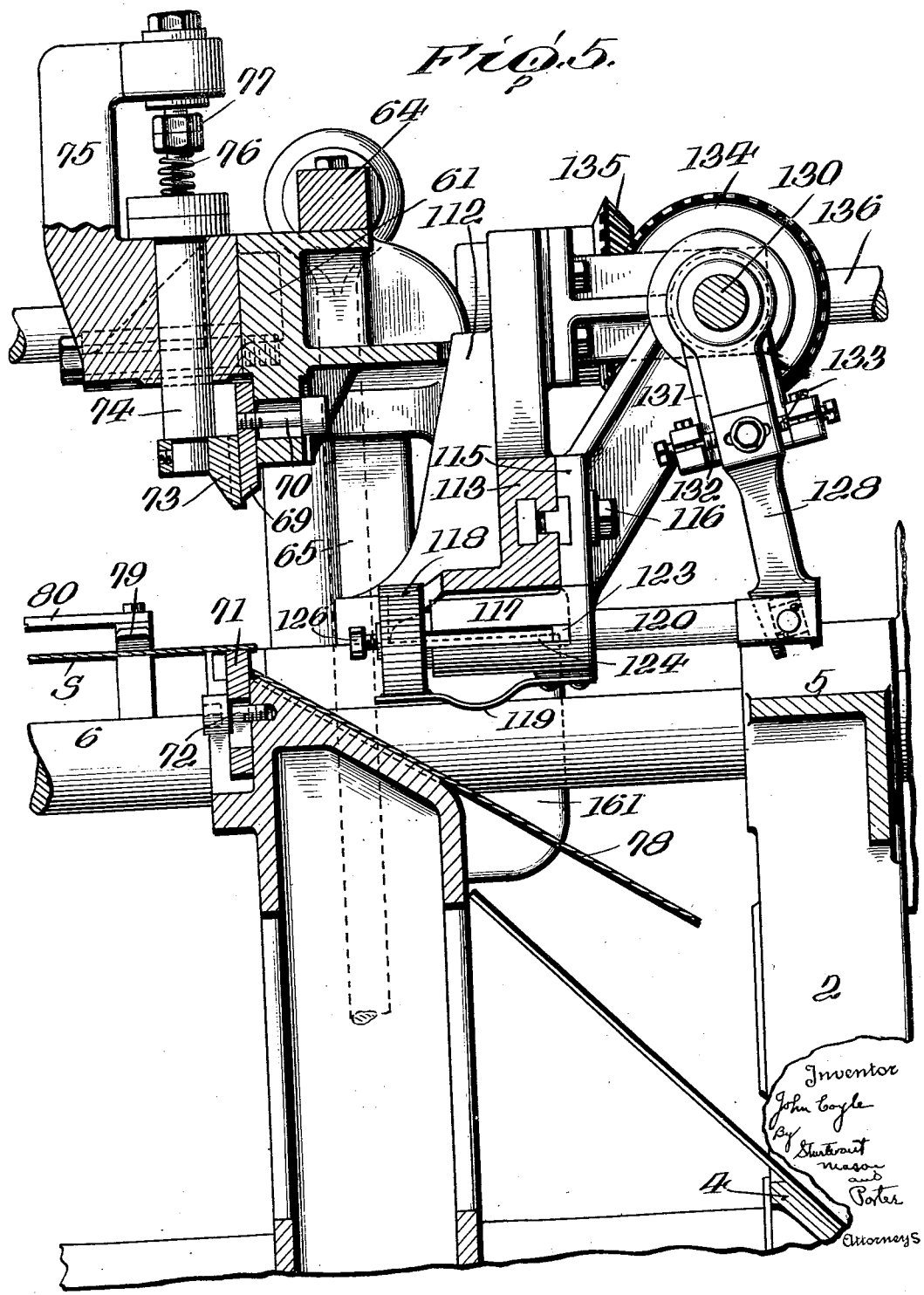

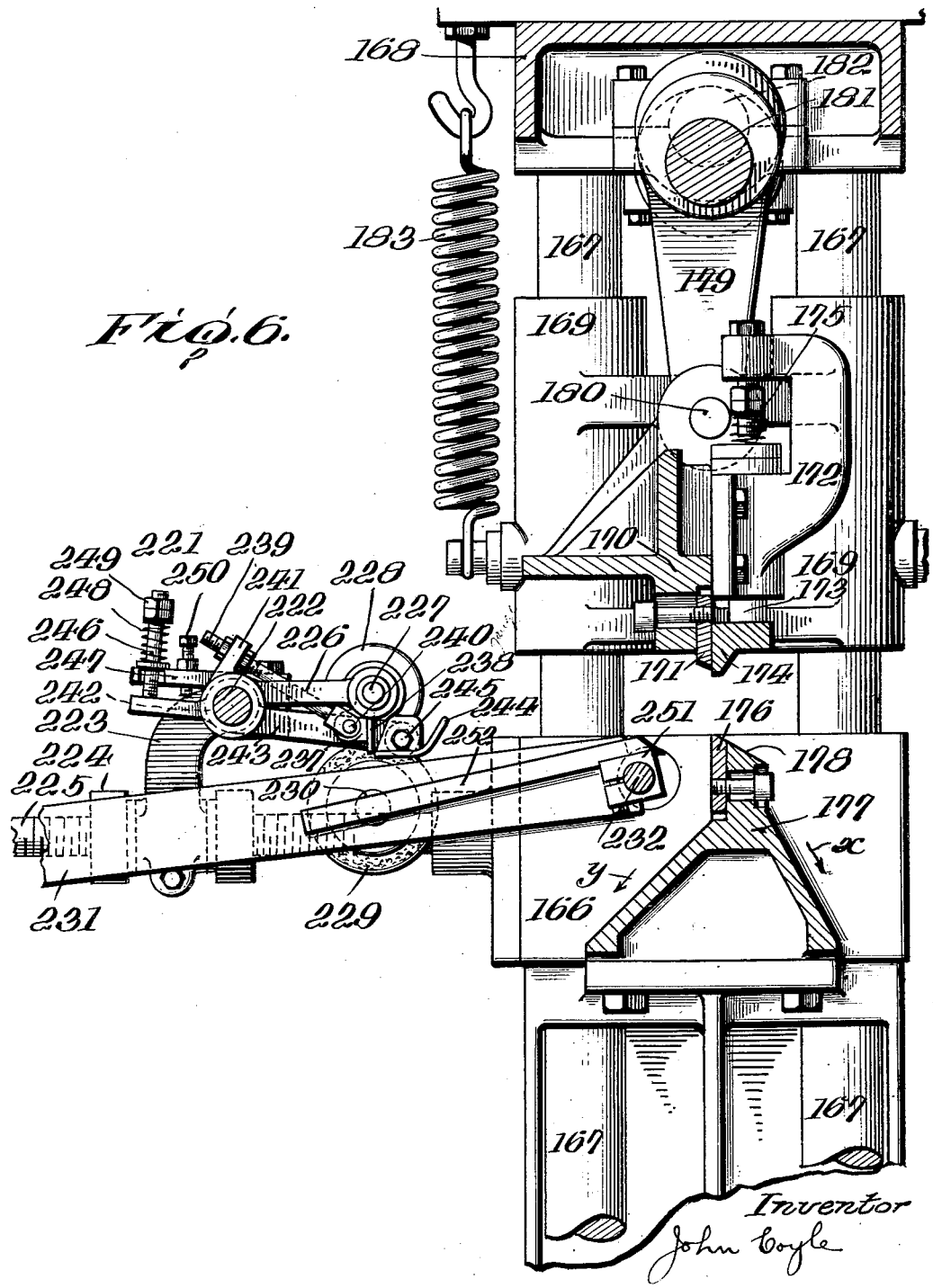

April 17, 1934. J. COYLE 1,955,671
MACHINE FOR CUTTING CAN BODY BLANKS FROM METAL SHEETS
Filed July 26, 1932 15 Sheets-Sheet 7
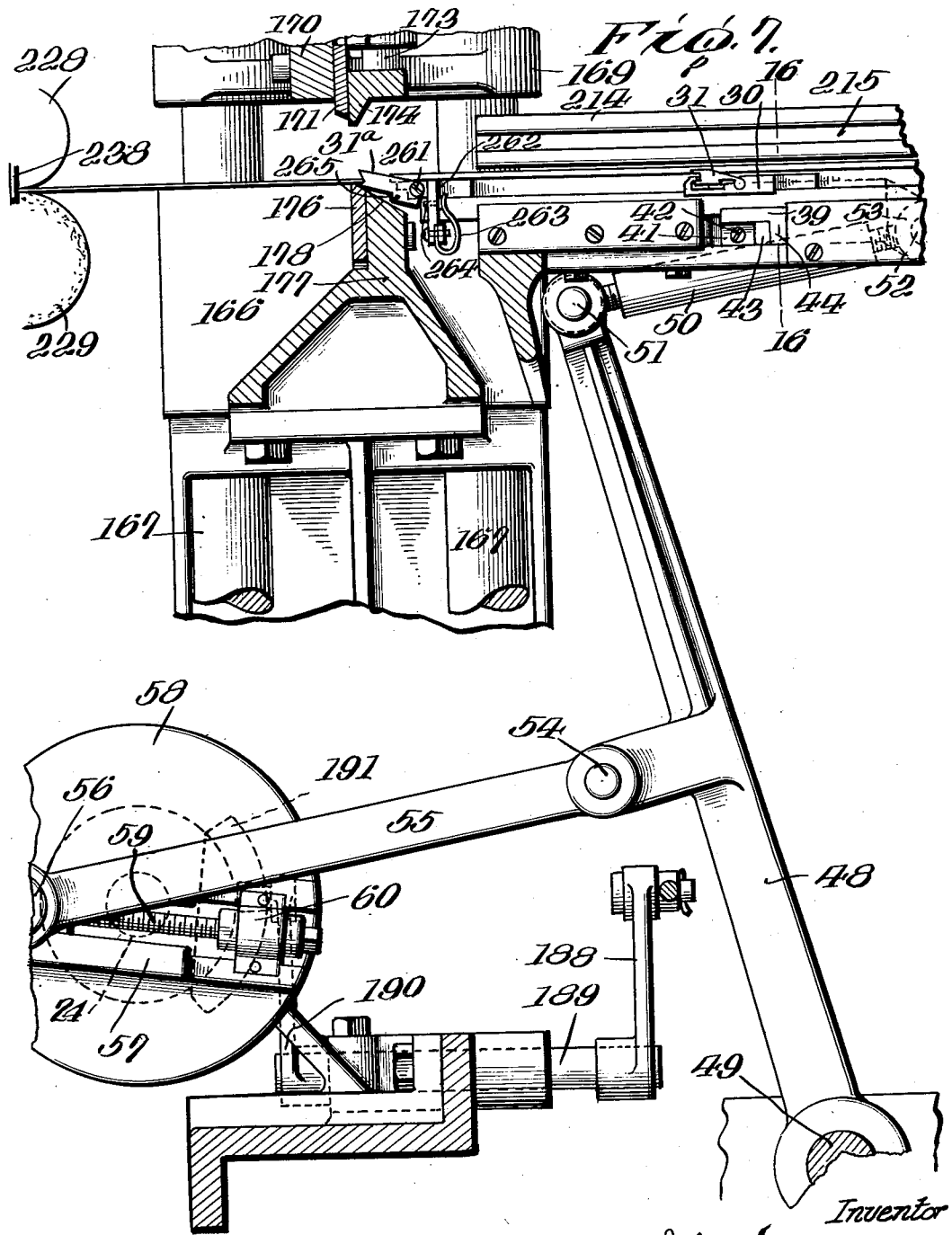
Inventor
John Coyle
By Sturtevant, Mason & Porter
Attorneys

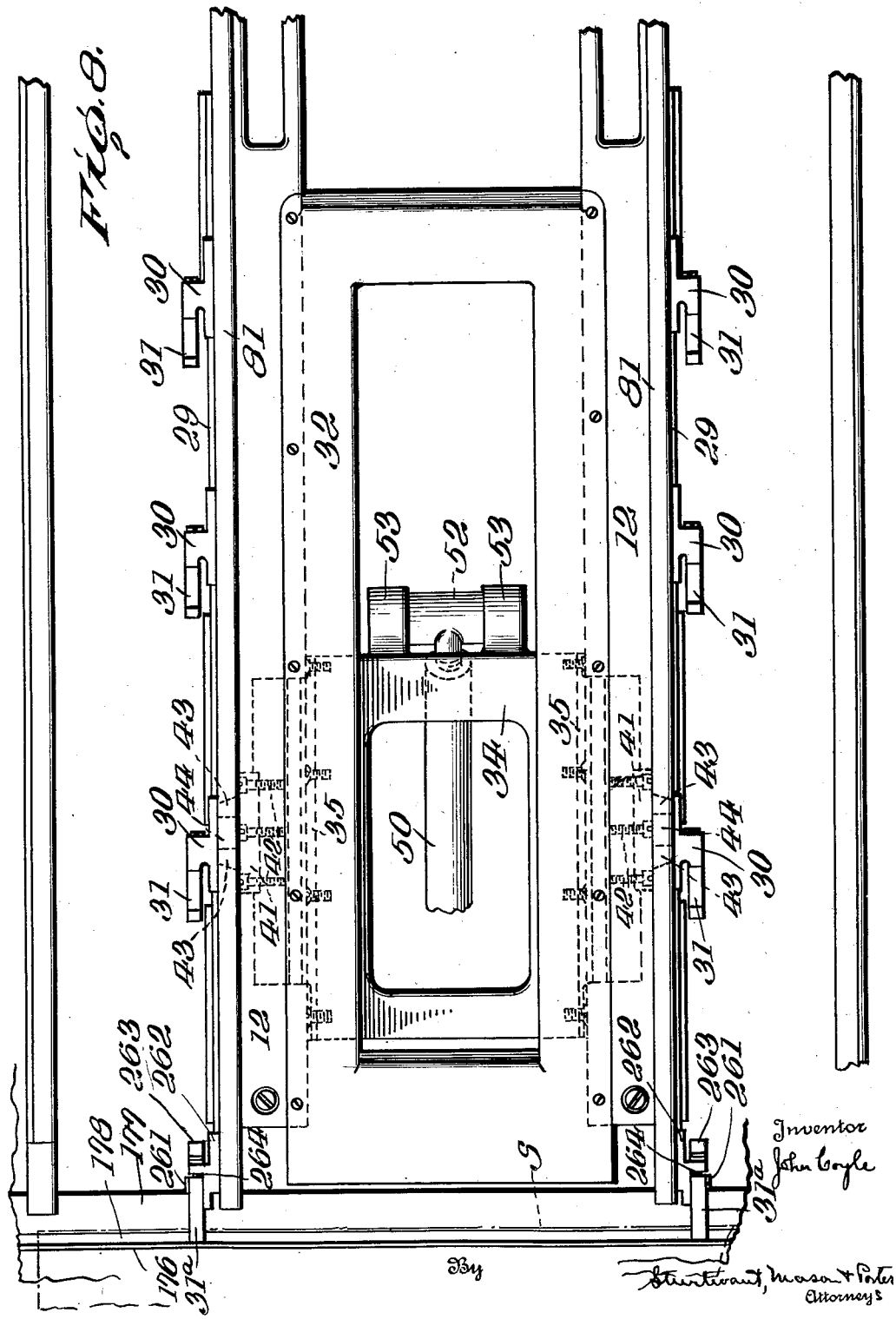

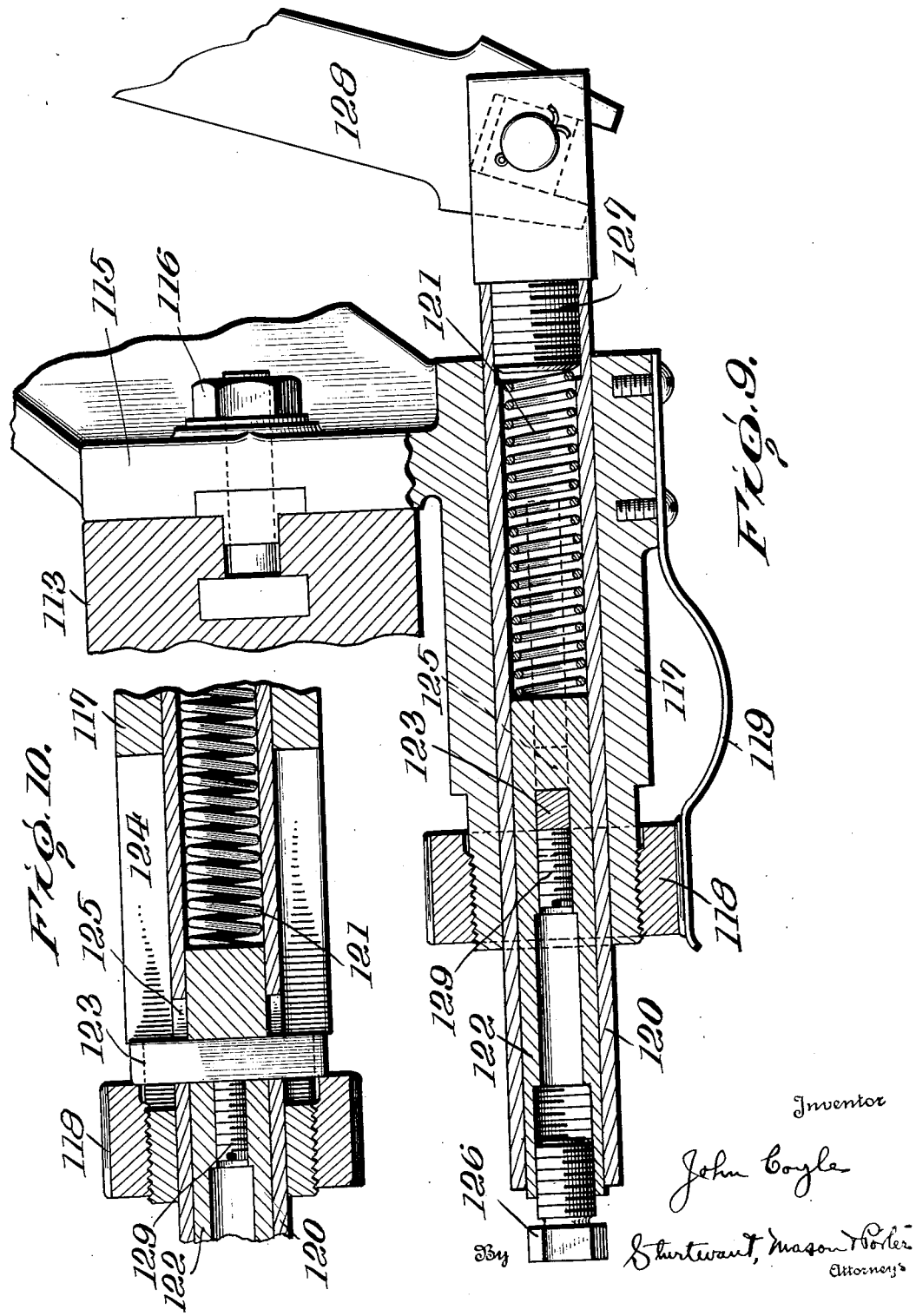

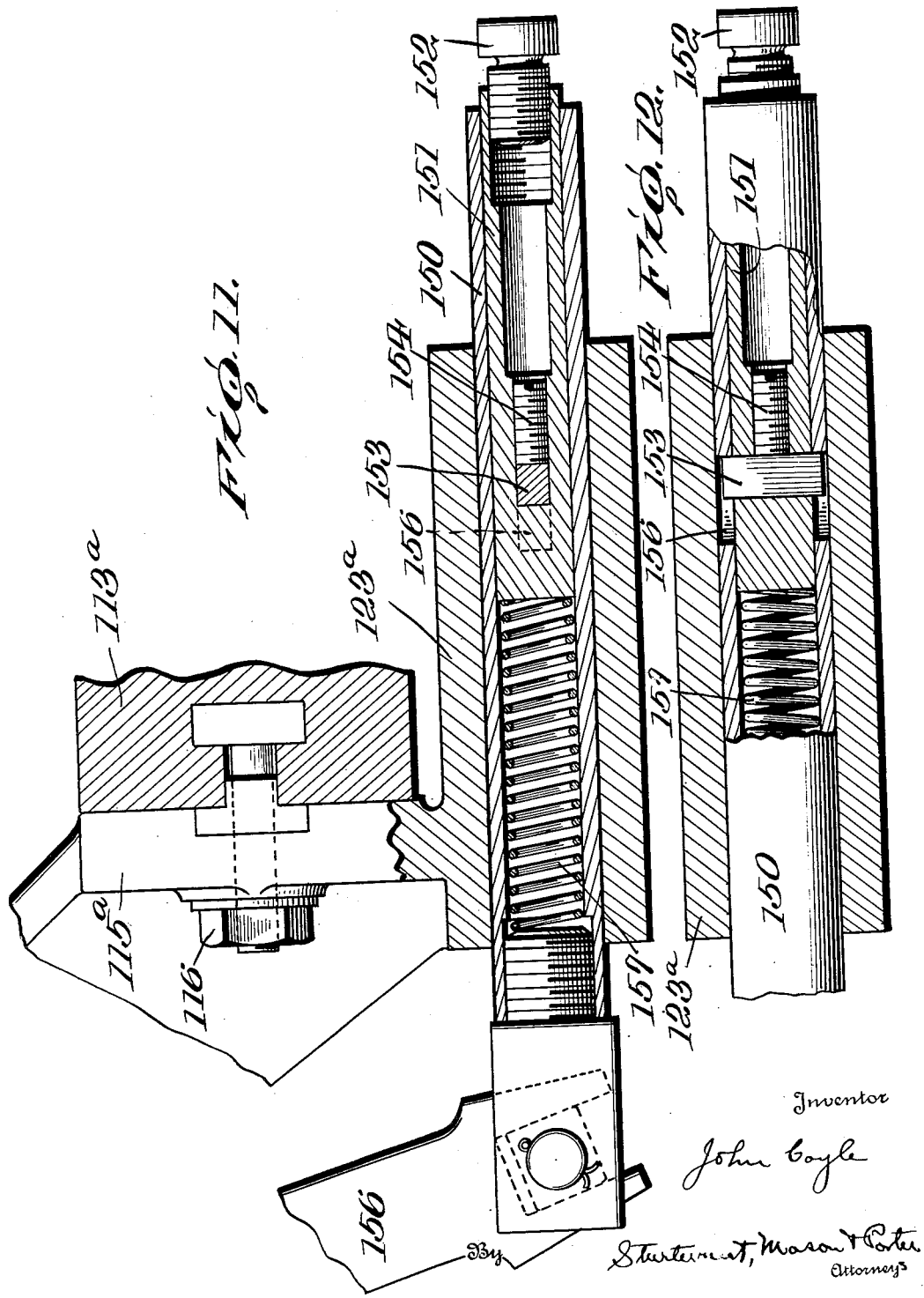

April 17, 1934. J. COYLE 1,955,671
MACHINE FOR CUTTING CAN BODY BLANKS FROM METAL SHEETS
Filed July 26, 1932 15 Sheets-Sheet 11
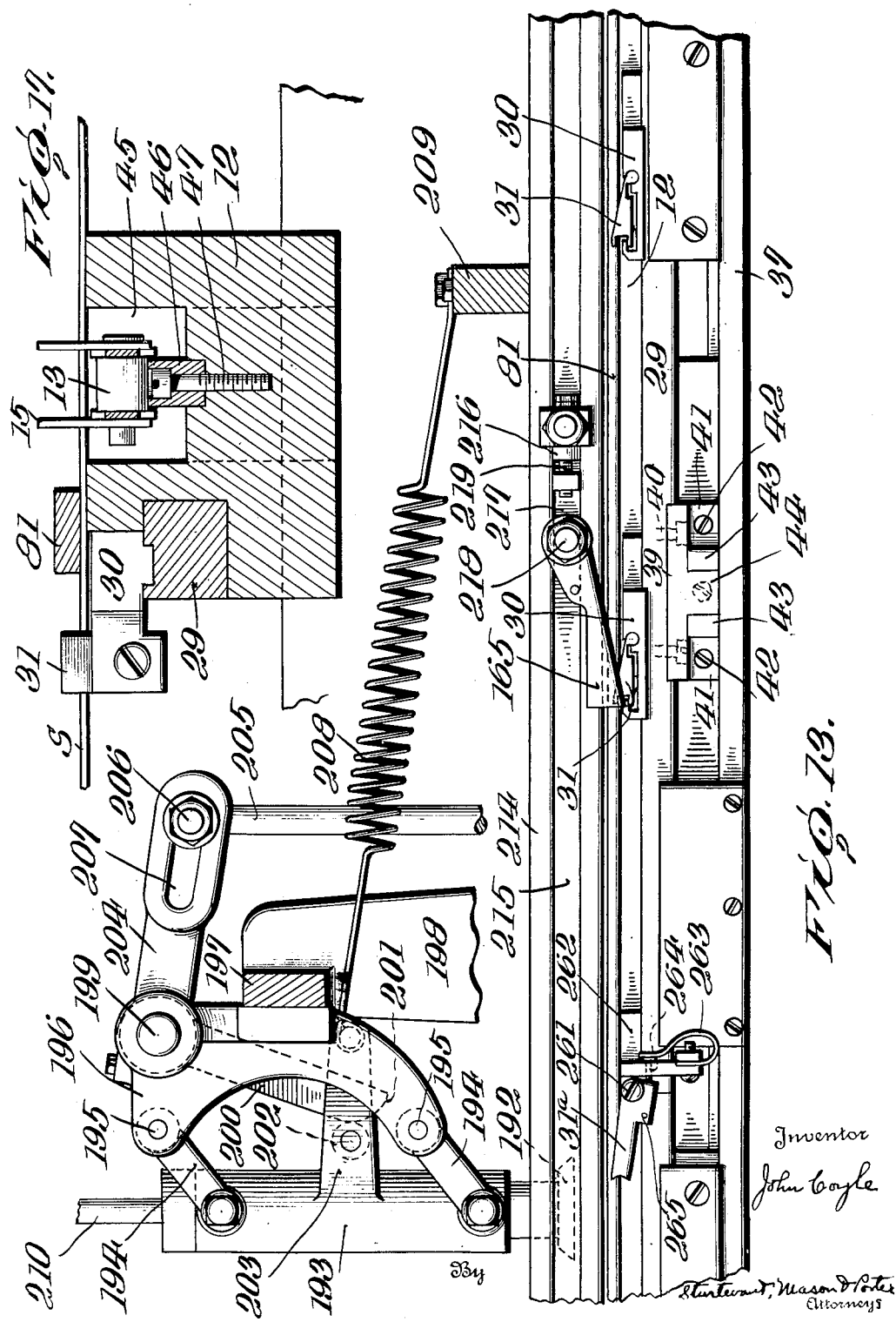
Inventor
John Coyle
By
Sturtevant, Mason & Porter
Attorneys

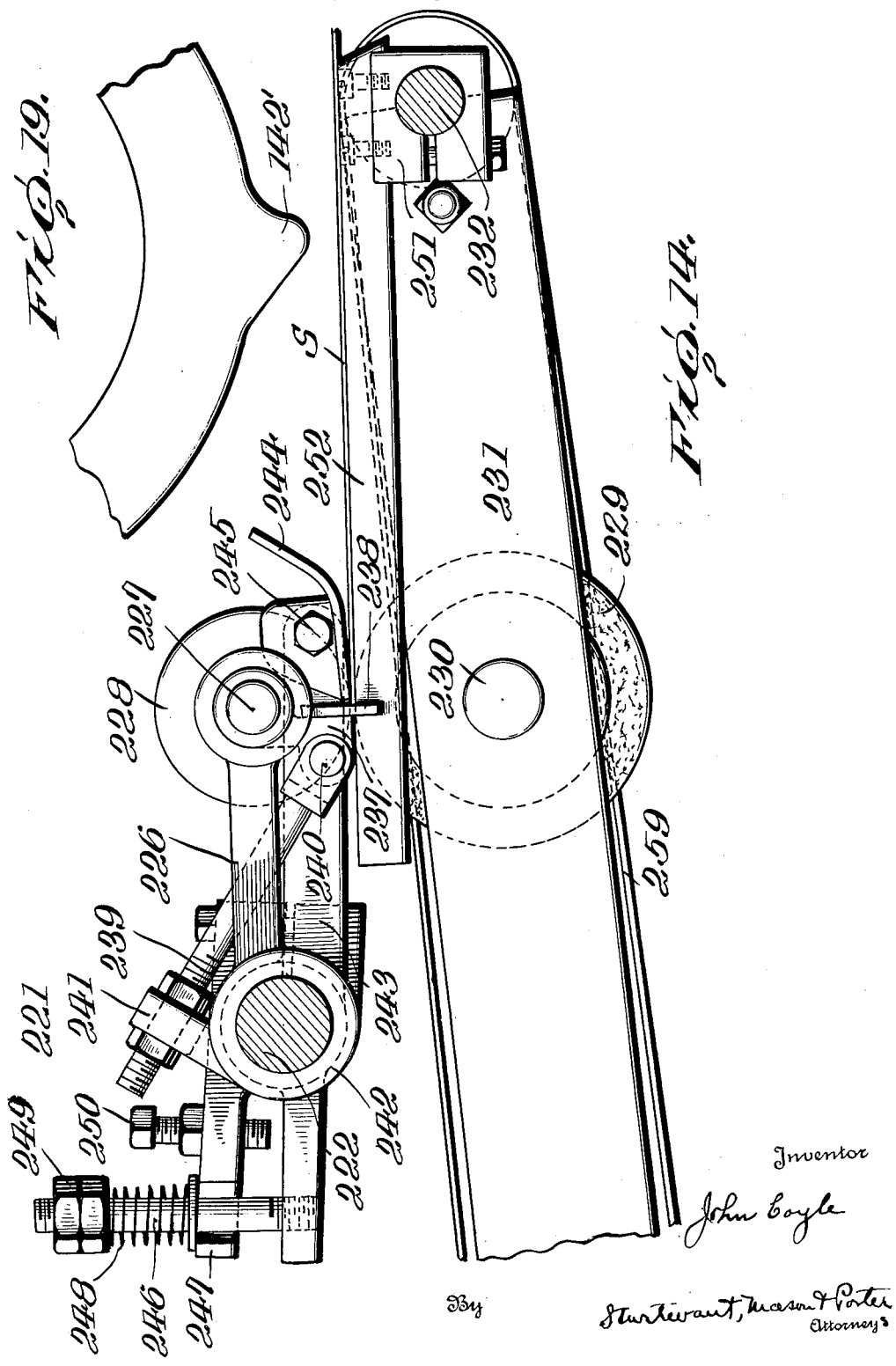

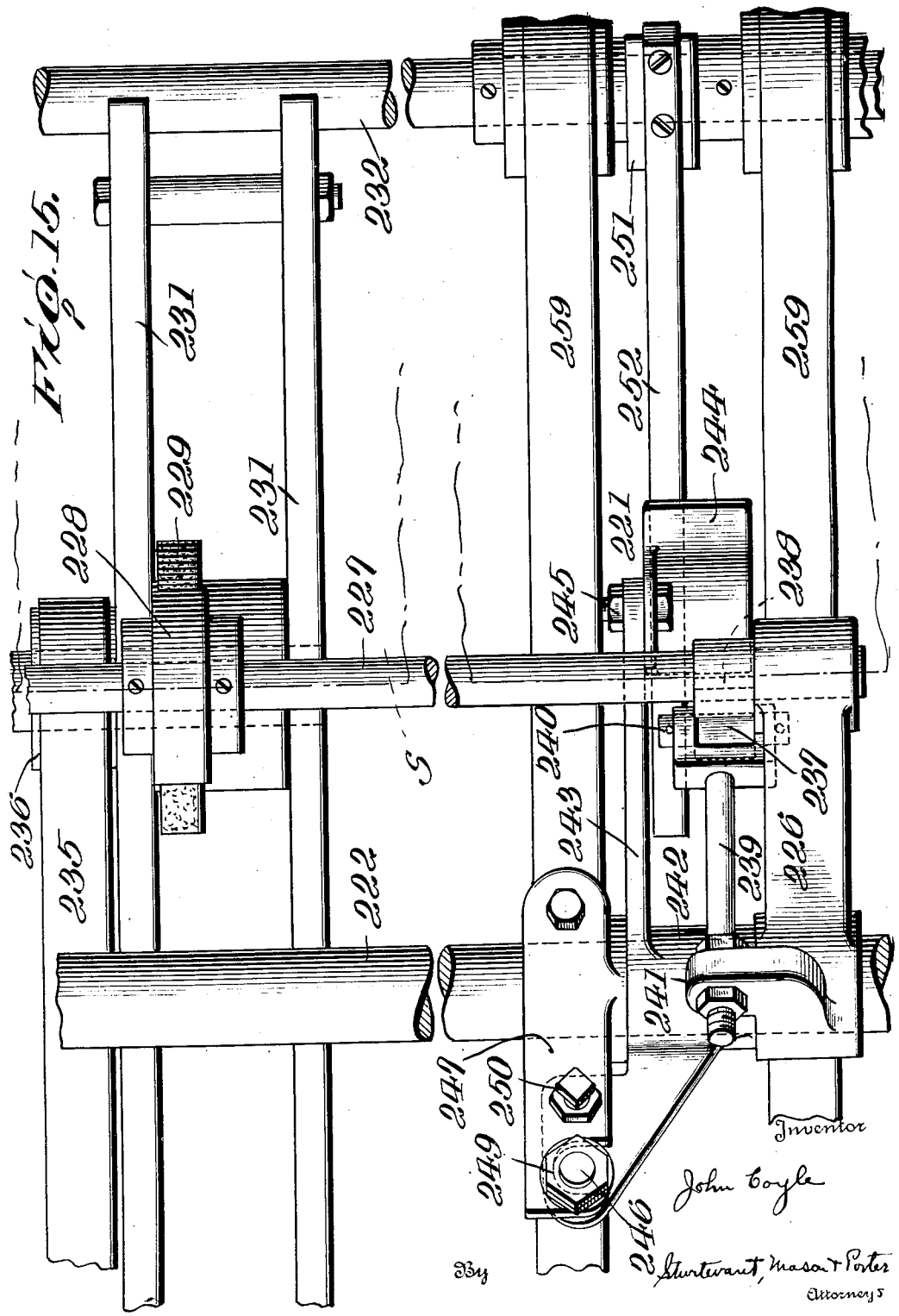

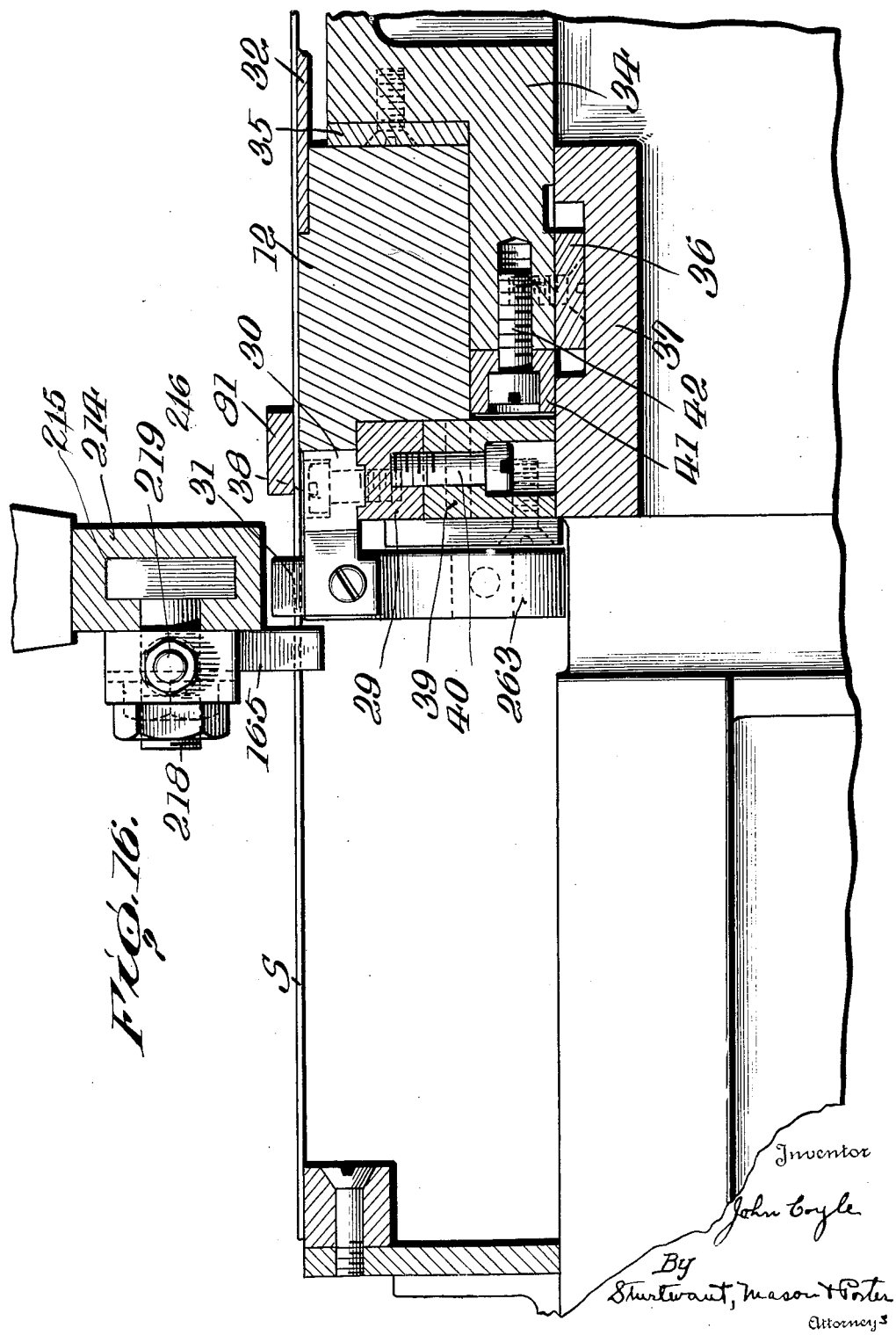

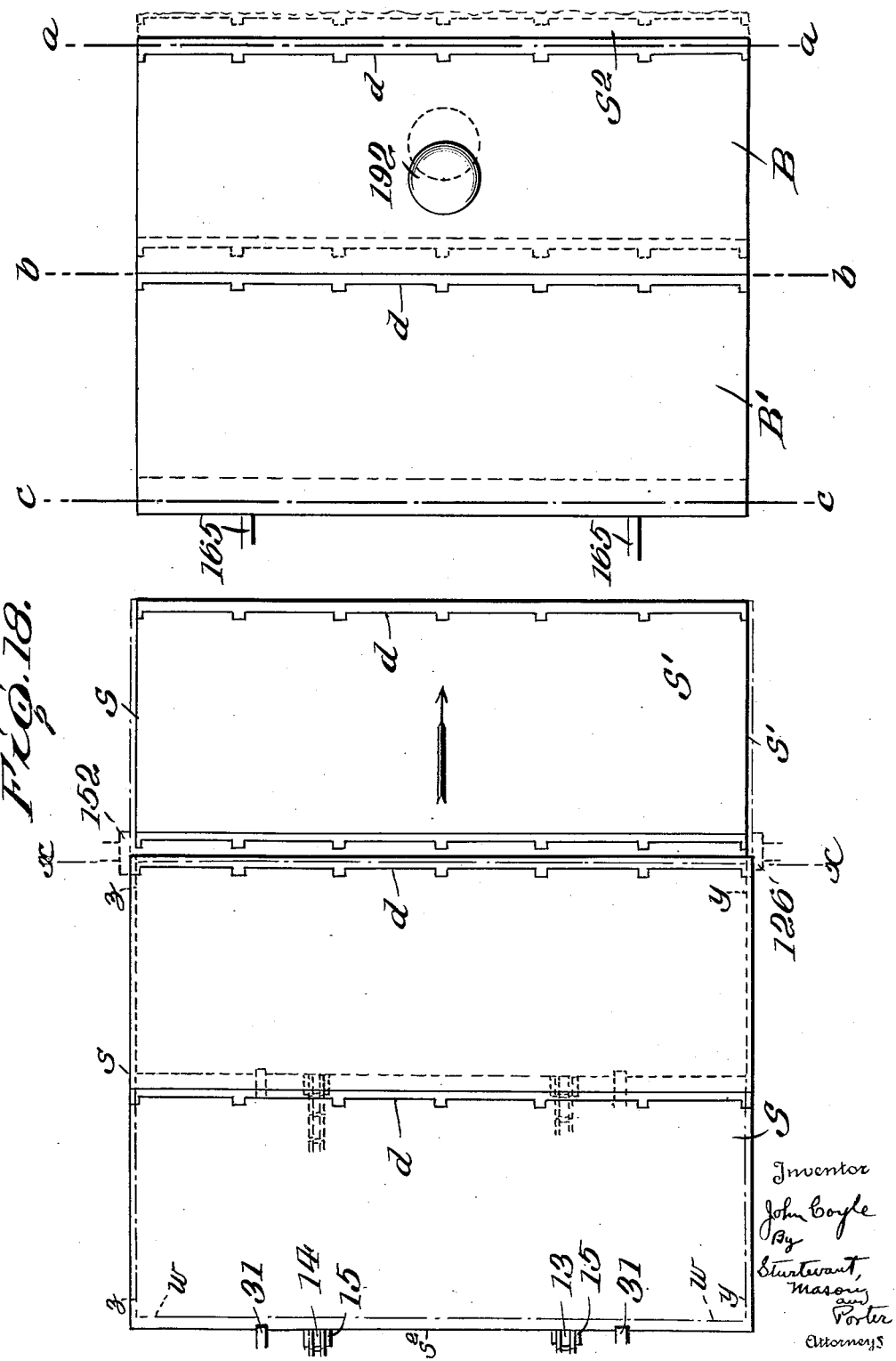

Patented Apr. 17, 1934

1,955,671

UNITED STATES PATENT OFFICE 1,955,671

MACHINE FOR CUTTING CAN BODY BLANKS FROM METAL SHEETS

John Coyle, Baltimore, Md., assignor to Continental Can Company, Inc., New York, N. Y., a corporation of New York Application July 26, 1932, Serial No. 624,870

19 Claims. (Cl. 164—48)

The invention relates to new and useful improvements in a machine for cutting a metal sheet so that can body blanks can be made therefrom.

An object of the invention is to provide a machine for automatically trimming a sheet and for cutting said sheet into blanks which may be subsequently cut to provide can body forming blanks.

A further object of the invention is to provide a machine of the above type wherein the trimming and the cutting of the sheet is accomplished by reciprocating shear cutters.

A still further object of the invention is to provide a machine of the above type wherein a pair of shear cutters are arranged for simultaneously trimming the side edges of the sheet, while the single reciprocating cutter trims the end edges and the sheet into blanks.

A still further object of the invention is to provide a machine of the above type wherein variable means is provided for controlling the operation of the shear cutters so that they may be properly timed for the cutting from sheets of metal varying lengths of body blanks.

A still further object of the invention is to provide a machine of the above type wherein the sheet is positioned for the trimming of the side edges thereof by yieldingly mounted gauges, one of which is held in a predetermined set position during the positioning of the sheet, so as to trim both edges of the sheet by the gauging of the sheet from one side thereof.

A still further object of the invention is to provide a gauging mechanism for positioning the sheet for trimming the end edge thereof, and an independent gauging mechanism for positioning the sheet for the subsequent cutting operations thereof.

These and other objects will in part be obvious and will in part be hereinafter more fully disclosed.

In the drawings which show by way of illustration one embodiment of the invention—

Fig. 2 is a plan view of the machine with certain parts omitted for the sake of clearness;

Fig. 3 is a plan view of the end of the machine after the sheets are gauged and cut into blanks;

Fig. 4 is a view partly in transverse vertical section from the receiving end of the machine;

Fig. 5 is a vertical sectional view through the cutting unit at the right of the machine as viewed in the direction of the feed of the blank through the machine;

Fig. 6 is a vertical sectional view through the transverse cutter for trimming the end edges of the sheet and cutting the same into blanks, also showing the gauging means for positioning the sheet for the cutting of the blank and the trimming of the rear edge of the sheet;

Fig. 7 is a vertical sectional view showing transverse cutters, the feed bars and the feed finger for positioning the sheet in the cutter for the operation of trimming the rear edge of the sheet, also showing the portion of the mechanism for controlling the clutch of the transverse shear cutter;

Fig. 8 is a view in plan showing the mechanism for operating the feed bars;

Fig. 9 is a vertical sectional view through the gauge associated with the longitudinally arranged cutter at the right of the machine when viewed in the direction of feed;

Fig. 10 is an enlarged horizontal view through a portion of the same;

Fig. 11 is a vertical sectional view through the gauge at the left of the machine as viewed in the direction of the feed;

Fig. 12 is a horizontal view through the gauge as shown in Fig. 11;

Fig. 13 is a side view of one of the feed bars, also showing the gauge for positioning the sheet for the trimming of the advance edge thereof and the means for placing the sheet against the gauge;

Fig. 14 is an enlarged view of the gauge and the take-away conveyor for positioning the blanks for the transverse cutter;

Fig. 15 is a plan view of the parts as shown in Fig. 14;

Fig. 16 is a transverse sectional view through one of the supporting bed rails, and showing the connecting means for operating the feed bar, and also showing the manner of supporting the gauge which positions the sheet for the initial transverse trimming of the same;

Figure 1:
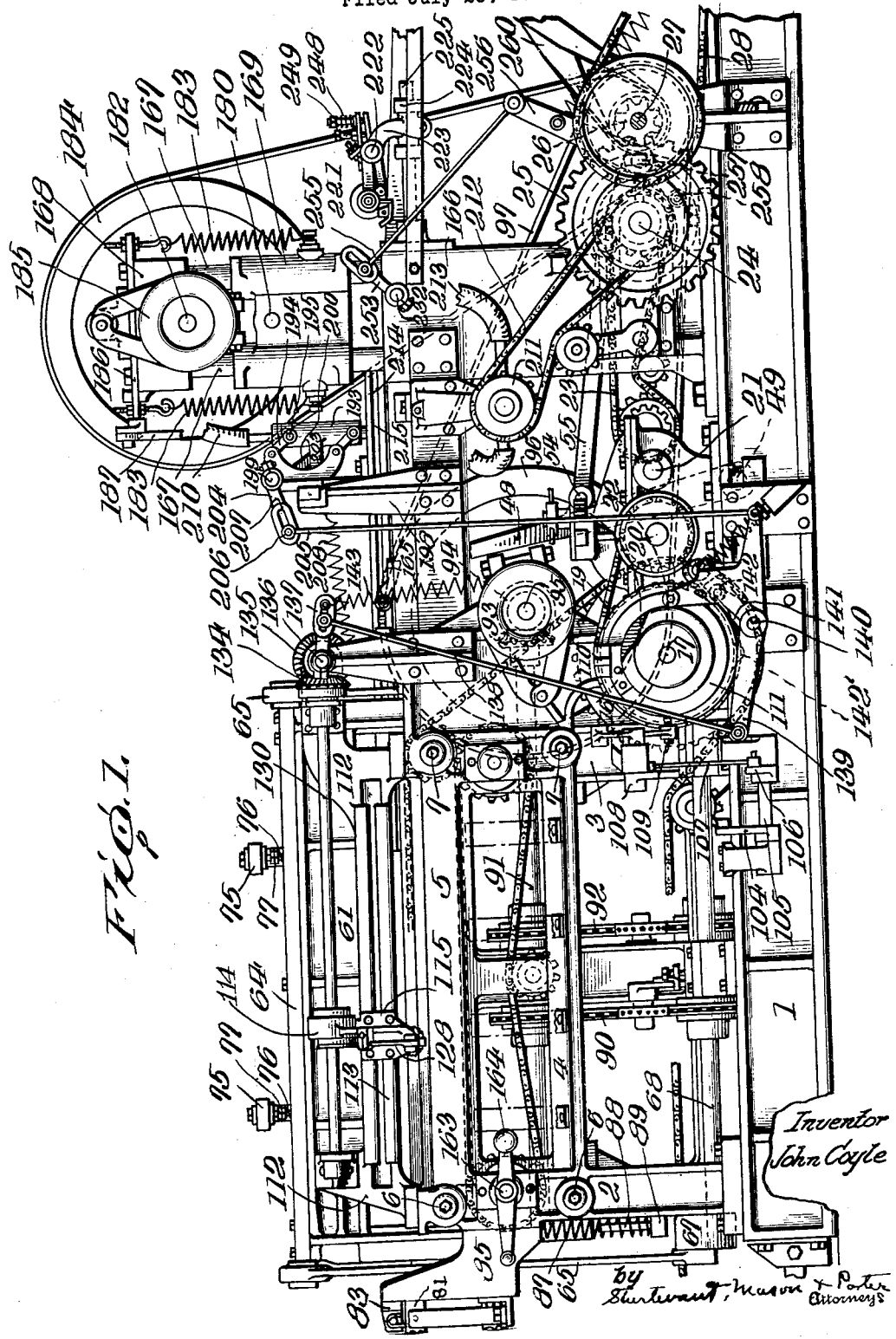
Figure 1 is a side view of a portion of the machine embodying the improvements.

Fig. 17 is a transverse sectional view through one of the supporting bed rails showing the feed bar and the feed dog carried thereby, also showing the conveyor for conveying the sheet, Fig. 18 is a view showing more or less diagrammatically the feeding of a sheet through the machine and the manner of trimming and cutting the same into blanks, and Fig. 19 is a detail showing a portion of the control cam for operating the clutch associated with the parallel shear cutters.

The invention has to do with a machine for trimming and cutting metal sheets into blanks which may be subsequently cut to form body blanks from which can bodies are made. The machine includes a supporting bed along which the sheets are conveyed to cutting devices for simultaneously trimming the side edges of the sheet, and to a transverse cutting device for trimming the end edges of the sheet and cutting said sheet into blanks. The sheets are conveyed to the machine by traveling chains carrying feed dogs which move the sheet on to the bed and well up to the first station where the sheet stops while the side edges thereof are being trimmed. The trimming devices are shear cutters which reciprocate, and the sheet stands still while being cut by the shear cutters. The feed bars are provided with feed fingers, which feed bars are reciprocated and timed so as to move the sheet away from the feed dogs. The feed bars stop in their forward movement, and the sheet remains stationary while it is trimmed, after which the feed dogs on the conveyors again pick up the sheet and carry it forward for the transverse cut. The transverse cutter is also a shear cutter. The sheet is carried into the cutting device and then is retracted so as to place the rear edge of the sheet against fixed gauges, and this positions the sheet for the trimming of the advance edge thereof. The sheet is then moved forward again by the reciprocating feed bars, and the trimmed edge of the sheet brought in contact with the gauge which positions the sheet for the severing of the same to form the blank. The sheet is then moved forward again and positioned for the severing of another blank therefrom, and in the adjustment of the machine as illustrated, this last cutting operation also trims the rear edge of the sheet.

It is thought that the invention will be better understood by a detail description of the machine. The machine includes a supporting bed 1 carrying parallel standards 2, 2 at the receiving end thereof and parallel standards 3, 3 intermediate the ends of the bed. Connecting these standards 2 and 3 are side rails 4 and 5. Extending across the machine from one standard 2 to the other standard are supporting rods 6, 6. Extending between the standards 3, 3 are supporting rods 7, 7. This makes up the main frame of the portion of the machine where the side edges are trimmed. Mounted on the frame and an extension thereof are supporting rails 8, 9 and 10 on which the sheets of metal which are to be trimmed are supported and along which they slide. In alinement with the rails 8 and 10 are supporting rails 11, 11. Intermediate these rails 11, 11 are supporting rails 12, 12. The sheets are conveyed along these supporting rails by two endless conveyors 13 and 14. The endless conveyors are provided with upwardly projecting fingers or dogs 15 which engage the sheet and move it along the supporting rails. There are a series of these spaced dogs, and they engage one sheet after another and move the sheet to a position adjacent the first trimming station. The endless conveyors pass over sprocket wheels carried by the frame, and also over a driving sprocket 16 mounted on a shaft 17. The shaft 17 is driven from the shaft 20 by a sprocket chain 19. This sprocket chain 19 runs over a sprocket wheel on the shaft 20. The shaft 20 is driven from the shaft 21 by a transmission mechanism which is located in the gear box 22. The shaft 21 is in turn driven by a sprocket chain 23 running over a sprocket wheel on the shaft 24. The shaft 24 carries a gear 25 which meshes with a gear 26 on the shaft 27. The shaft 27 is driven by a belt 28 cooperating with a driving wheel on the shaft of a motor. Through this train of mechanism just described, the endless conveyors are driven continuously.

It is desirable that the sheet when brought to the trimming station shall stop while the edge portions thereof are being trimmed. This is accomplished by transferring the feed of the sheet from the dogs or fingers on the conveyor chains to feed members which are reciprocated. The supporting rails 12, 12 along which the sheets are fed, are provided with recesses in their upper faces in which the conveyors 13 and 14 travel (see Fig. 4). Also mounted on each rail 12 is a feed bar 29. Each feed bar 29 carries a series of brackets 30 each of which supports a feed dog or finger 31. These fingers are pivotally supported in their brackets and a spring normally raises the feed dog to an elevated position. The upward movement of the feed dog is limited by the forked end of the feed dog engaging a lip on the bracket 30. The dogs will yield on the retracting movement of the feed bars so as to pass beneath the sheets on the supporting rails, and when in retracted position, the dogs will be raised so that the forward movement of the feed bars will cause the dogs to engage the sheets and feed them forward.

Attached to the rails 12 is a plate 32. Beneath the plate 32 is a reciprocating head 34. This head 34 is provided with a wear plate 35. The head 34 extends beneath the rail 12. Said head is also provided with a wear plate 36 engaging the frame member 37. The feed bar 29 to which the brackets 30 are attached by bolts 38 slides along the side of the rail 12. The feed bar is attached to a member 39 by a series of bolts 40. The member 39 contacts with the frame member 37 and slides thereon. The reciprocating head 34 carries a bracket member 41 which is secured thereto by bolts 42. The bracket member 41 is provided with two spaced laterally projecting lugs 43, 43 which straddle a portion 44 carried by the member 39. This serves to connect the feed bar to the reciprocating head. It is understood that both feed members are connected to the same head and by a similar means. The rail 12 at each end of the region of reciprocation of the head 34 makes direct contact with the feed bar 29, as clearly shown in Fig. 17. The conveyor chains travel in recesses 45 formed in the rails and rest on bars 46 secured to the rails by bolts 47 (see Fig. 17).

The head 34 is reciprocated by means of a lever 48. The lever 48 is mounted on a shaft 49 for oscillation. A link 50 is pivoted at 51 to the lever, and at 52 to a pin mounted in spaced lugs 53, 53 carried by the reciprocating head. The link 50 includes a central sleeve into which the end members are threaded, and these end members have right and left-hand threads so that the link may be lengthened or shortened by turning the sleeve. The lever 48 is pivoted at 54 to a link 55 which in turn is pivoted to a crank pin 56 mounted on a block which is slidable in ways 57 carried by a disk 58 mounted on the shaft 24. A threaded bolt 59 is attached to the block for shifting the same radially of the disk 58. This bolt 59 is mounted in a fixed sleeve 60 which is secured to the disk. The bolt is provided with a head whereby it may be turned for shifting the position of the crank pin 56 radially of the disk 58. By this shifting of the crank pin, the length of the stroke of the reciprocating head may be varied, and by adjusting the link 50, the reciprocating position of the head may be varied. The position of the crank pin 56 is such that the feed bar moves at a greater speed than the conveyor chains. The feed bar while on its rearward reciprocation, places one of the feed dogs in rear of the sheet, and as the feed bars move forward, the sheet will be taken away from the feed dogs on the conveyor chains and brought to a position for trimming, where the sheet stops, by reason of the fact that the feed bar has reached the end of its forward reciprocation. The trimming operation takes place before the feed dogs again contact with the sheet for moving it away from the trimming station.

There is a shear trimmer at each side of the frame for trimming the side edges of the sheet. In Fig. 18 of the drawings, a sheet to be trimmed and cut into blanks is indicated at S. As shown in full lines in this figure at the left, the sheet has been brought by the conveyor chains to a position where the dogs 31 on the feed bars engage the sheet and the sheet is then moved forward to the position indicated at S', where the sheet comes to a dwell while the trimming of the side edges s and s' take place.

The shear trimmer at the right-hand side of the machine, as viewed in the direction of the feed of the sheet, is shown in Fig. 5 of the drawings. The shear trimmer includes an upper movable cutter head 61. This cutter head is mounted on two bars 62 and 63 which are preferably circular in cross section. These bars are mounted for reciprocation in bearing sleeves carried by supporting brackets 161. These supporting brackets 161 are in turn mounted for lateral shifting movement on supporting rods 6, 6 and 7, 7, respectively, carried by the side frames of the machine. The cutting head with the supporting means therefor makes up a shiftable cutting unit. A threaded shaft 163 mounted in the frame and provided with a handle 164 for the turning of the same, engages a threaded sleeve carried by the bracket 161 and by the turning of this shaft the cutting units may be adjusted toward or from each other. The shafts are threaded in opposite directions so that the turning of the shaft in one direction will move the units toward each other and by turning the shaft in the opposite direction, the units may be shifted away from each other. Attached to the cutter head 61 is a horizontal bar 64, and attached to the ends of this bar are links 65. There is one at each end of the cutter head. The link 65 is pivoted to the bar and is also pivoted to a crank pin 66 carried by the disk 67 on a shaft 68. As this shaft 68 rotates, the cutter head will be reciprocated in the sleeve bearings on the frame.

The cutter head includes a cutting blade 69 which is secured to the cutter head by bolts 70 which permits the cutting blade to be raised or lowered and firmly clamped to the cutter head. Cooperating with this movable cutting blade 69 is a stationary shear blade 71 which is secured by clamping bolts 72 to a frame member which is attached to the brackets 161. This lower shear blade may be adjusted as to position.

Mounted on the movable cutter head is a presser bar 73 attached to standards 74 mounted to slide in a bracket 75 which is bolted to the cutter head, so that the bracket moves up and down with the cutter head. The standards 74 are yieldingly forced downwardly by springs 76, the tension of which may be adjusted by shifting the abutment screws 77 carried by the bracket, against which the upper ends of the springs engage. When the cutter head moves downward, the presser bar 73 will engage the sheet and yieldingly press the sheet against the stationary shear blade, while the movable shear blade 69 trims the edge portion thereof from the sheet. This trimmed off edge portion falls on to the plate 78 and is discharged from the machine. It is understood that there is a similar cutter head at the other side of the machine which simultaneously trims the other side edge of the sheet, which in a like manner, is discharged from the machine. This other cutter head is similarly mounted and shiftable on the rods 62. The sheet is moved along the supporting rails therefor by the feeding mechanism which has just been described. The feeding mechanism carries the sheet beneath yielding shoes 79. These yielding shoes are carried by cross bars, one of which is indicated at 80 in Fig. 2 of the drawings. There are also shoes 81, 81 which contact with the sheet in the region of the traveling conveyors. These shoes 81, 81 are likewise attached to the cross bar 80 and to a cross bar 82. The cross bars connecting the shoes make up the weighted frame under which the sheets pass, and the weight of the frame holds the sheets firmly in contact with the rails during the trimming operation. The sheet, however, is moved beneath this weighted frame by the traveling conveyors and the reciprocating feed dogs, and after the sheet is trimmed, it will be moved further along under the frame and to the next trimming station. The shoes 81 project in front of the cross bar 83 which is attached to the frame members 2, 2. This cross bar 83 is carried by brackets 85 attached to the end members 2, 2 (see Fig. 1), and the weighted frame carrying the presser shoes is hooked to this cross bar which holds the weighted frame from movement with the feed. By releasing the frame from the cross bar it may be readily removed, if desired.

Attached to the cutter head is an abutment plate 86 and this abutment plate contacts with two compression springs 87, 87. The compression springs encircle rods 88, 88, respectively, carried by a projection 89 extending from the bracket 161. There are compression springs at each end of the cutter head, and they serve to carry the weight of the cutter head in part, and counterbalance in a sense the reciprocating movements of the cutter head.

The shaft 68 at one side of the machine carries a sprocket wheel which is driven by a sprocket chain 90. This sprocket chain runs over a sprocket wheel on the shaft 91. The shaft at the opposite side of the machine for operating the other cutter head is rotated by means of a chain 92 which runs over another sprocket wheel on the shaft 91. The shaft 91 is provided with a bevel gear 93 which meshes with a bevel gear 94 on the shaft 95. The shaft 95 is adapted to be connected by the aid of a suitable clutch with a driving belt wheel 96. The belt wheel 96 is driven by a belt 97 from a belt wheel on the shaft 27. The clutch intermediate the belt wheel 96 and the shaft 95 is of the usual type, and is controlled by a shiftable dog indicated at 98 in the drawings. When this dog is thrown into the path of certain moving parts on the belt wheel, it closes the clutch, so as to give a rotation to the shaft 95. In this way, the shaft 95 is given one complete rotation, and then is disconnected from the continuously moving belt wheel 96. This enables the cutter heads to be given a reciprocation for trimming the edges of the sheet, and then brought to a dwell. The dog 98 which controls the clutch is carried by a rock shaft 99 to which is connected a link 100. The link 100 is in turn adjustably connected to a rocker arm 101. The rocker arm 101 is mounted on a shaft carrying a second rocker arm 102 to which a rod 103 is connected. This rod extends across the machine and is connected to an arm 104 mounted on a shaft 105. The shaft 105 carries another arm 106 connected by a link 107 to a bell crank 108, and the bell crank 108 carries a roller 109 which cooperates with a cam 110 on a cam disk 111. This cam disk 111 is mounted on the shaft 17. The manner of driving the shaft 17 has been described above. When the cam 110 engages the roller 109 it will actuate the train of mechanism which throws the clutch for bringing about one reciprocation of the cutter heads at the sides of the machine. The cutter heads after this cutting operation will remain idle until the cam 110 again trips the clutch for operating the same. By this control means, the cutters may be operated very quickly to sever the sheets, and then remain idle for any desired period of time. In the present machine, the shear cutters at the sides are given one reciprocation, while the transverse shear cutter about to be described is operated for trimming the advanced edge of the sheet, the cutting of the sheet to form two blanks, and then the trimming of the rear edge of the last severed blank.

It is important that the sheet shall be properly positioned for the trimming of the side edges thereof, and so that the sheet will be positively set or gauged from one side only. The gauges operating to position the sheet will now be described. In Fig. 5, there is shown in side view, the gauge for contacting with the edge of the sheet at the right thereof as viewed in the direction of travel of the sheet. In Figures 9 and 10, the details of this side gauge are shown.

The brackets 161 are provided with upwardly projecting portions 112 which are connected by a cross member 113 (see Fig. 1). These parts may be made integral, if desired, and may be detachably mounted on the brackets 161, and are so shown. Attached to this cross member 113 is the side gauge unit 114. Said unit includes a bracket arm 115 which is adjustable along the member 113 and may be secured in any desired position thereon by clamping bolts 116. Rigid with the arm 115 is a supporting sleeve 117 and which has a reduced end which is threaded, and mounted on this threaded end is a gauge nut 118. The gauge nut 118 is provided with spaced grooves in the surface thereof, which are engaged by a yielding stop arm 119. The purpose of this stop arm is to hold this gauge nut in a fixed or set position. Movable in the supporting sleeve 117 is an inner sleeve 120. This inner sleeve 120 contains a spring 121 and a gauge member 122. The gauge member 122 carries a cross pin 123 which is free to slide in a slot 124 in the supporting sleeve 117. It also has a limited movement in a slot 125 in the inner sleeve 120. Threaded into the free end of this gauge member 122 is a headed bolt 126 which contacts with the edge of the sheet. The spring 121 bears against an abutment 127 in the inner sleeve 120 and normally forces the gauge member 122 to the left, as viewed in Fig. 9, until the cross pin 123 contacts with the gauge nut 118. The rock arm 128 is reciprocated so as to bring the gauge member into contact with the edge of the sheet. When the gauge member contacts with the edge of the sheet, the cross pin is in contact with the gauge nut, so that upon a given reciprocation of the arm 128, this gauge member 122 and the headed bolt carried thereby will be moved to a fixed or set gauging position. While it is a fixed or set gauging position, it is determined by the spring 121 and the gauge nut 118, so that if the gauge nut 118 is shifted by turning the same, this will shift the gauge member 122 and the headed bolt 126 carried thereby to a different set or gauging position. The cross pin 123 is held in the gauge member 122 by a set screw 129. The arm 128 is mounted on a shaft 130 for free movements on the shaft. Fixed to the shaft is an arm 131 carrying adjustable screws 132 and 133. The rock arm 128 lies between these adjustable screws which hold the arm in a fixed or set position on the shaft 130. By turning these screws, however, the position of the arm may be adjusted on the shaft 130. The shaft 130 is journaled in the upwardly projecting portions 112 and carries a bevel gear 134. This bevel gear meshes with a bevel gear 135 on a shaft 136. The shaft 136 carries an arm 137 to which a link 138 is attached. This link at its lower end is connected to an arm 139 mounted on a stub shaft 140. Connected to and moving with the arm 139 is an arm 141 carrying a roller 142 which engages a peripheral cam 142' fixed to the shaft 17 (see Figures 1 and 19). The peripheral cam 142' is so disposed relative to the cam 110 that the side gauges are first operated to position the sheet and then the clutch is manipulated for causing the shear cutters to trim the side edges of the sheet. A spring 143 attached to the arm 137 and the frame holds the roller in contact with the cam and retracts the gauges while the cam moves the gauges forward. In order to positively insure that the gauges will be retracted, the shaft 130 is provided with an arm 144 which projects into the path of a projecting lug 145 carried by the cutter head, so that the cutter head on its down stroke will cause said lug to engage the arm and positively rotate the shafts controlling the gauges for retracting the same.

On the other side of the machine is a gauging member which is shown in detail in Figures 11 and 12. There is a bracket arm 115ª which is attached to the cross member 113ª and carries a supporting sleeve 123ª. This bracket arm is adjustable lengthwise of the cross member 113ª. Mounted on the supporting sleeve 123ª is an inner sleeve 150. Within the inner sleeve is a gauge member 151 carrying a headed bolt 152 which is adjustably set in the gauge member. A cross pin 153 is secured to the gauge member 155 by a set screw 154. There is a slot 156 in the inner sleeve into which this cross pin extends. A spring 157 bearing against the end of the gauge member forces the same to the right, as viewed in Fig. 12, until the cross pin engages the end of the slot. A rocker arm 158 is attached to a shaft 159 in the same manner that the rocker arm 128 is attached to the shaft 130. The shaft 159 carries a gear 160 which meshes with a gear wheel 160ª on the shaft 136. It will be noted that the shafts 130 and 159 are rotated in opposite directions when the shaft 136 is rotated. This swings both of the arms inward at the same time. During the operation of the machine, the gauge members are separated from each other to permit the sheet to pass between the gauge members. Both gauge members move inwardly until they contact with the side edges of the sheet. The spring 157 is of lighter tension than the spring 121, and as a result, the gauge member 151 will yield to accommodate sheets of different widths, so that the sheet is placed and set by the gauge member 122. The sheet is thus gauged at the same side which it is gauged for lithographing, if it happens to be a lithographed sheet, and the lines of trimming will be determined by the gauging of the sheet from this side.

From the above, it will be apparent that the sheet is placed between the shear cutters at the sides of the machine, and is brought to a stationary position, and is set by the gauging members for trimming, after which the trimming devices will shear cut the sheet so as to trim the edge portions thereof. The sheet is then advanced along the table or supporting rails and is presented to a shear cutting device extending transversely across the machine for the trimming of the advance and rear edges of the sheet and for the cutting of the sheets into blanks.

After the side edges of the sheets have been trimmed along parallel lines, it is next desired to trim the advance edge of the sheet. The sheet is then moved to the position indicated at $S^2$ in broken lines and is retracted against gauge members 165. This positions the sheet so that it is trimmed along the line $a, a$. The sheet is then moved forward and gauged by its forward edge and cut along the line $b, b$, which produces the first completed blank B. It is then moved forward and gauged by the front edge thereof and trimmed along the line $c, c$. This produces the second blank B'. This completes the operation of the present machine. These blanks are cut into body blanks in the usual manner. As shown in the drawings, the sheets are indicated as coated with a protective enamel, and the lines $d, d$ are the edges of the enamel coating on the sheet which provides the bare spaces to aid in the side seam formation. This is of well-known construction.

The sheet was brought to the side trimming position by the reciprocating feed bars which were retracted, leaving the sheet at the trimming position. It is taken away from the trimming position by the traveling dogs on the endless conveyors and carried to a position where the advance dog on the feed bars will take the sheet and carry it underneath the transverse cutting head. The feed dogs on the conveyors are timed relative to the operation of the feed bars so that the feed dogs will convey the sheet to a position adjacent the set position for trimming, and the reciprocating feed bars which move at a faster speed will engage the sheet and carry it away from the feed dogs to the set position for trimming. The trimming occurs before the feed dogs again contact with the sheet. The feed bars stop their reciprocation and the feed dogs contacting with the sheet take it up and move it from its position for trimming to the transverse trimming device. The transverse cutting head includes standards 166 at the sides of the machine, each of which carries vertically extending parallel rods 167, 167 which are mounted in a bracket 168 at the upper end thereof. Sliding on these rods is the cutter head. The cutter head includes sleeves 169, 169, one for each rod, and a connecting cross bar 170. The upper shear cutter 171 is adjustably attached to this cross bar. Mounted on the cross bar are brackets 172 carrying rods 173 on which the presser bar 174 is mounted. Springs 175 bear against these rods and yieldingly press the bar downwardly. The downward movement is limited by the head on the rod engaging the bracket. A spring bears against the adjustable abutment so that the tension thereof can be adjusted.

Cooperating with the shear cutter 171 is a shear cutter 176 which is vertically adjustable for properly positioning the same relative to the shear cutter 171. The upper edge of this cutter 176 tapers downwardly away from the cutting edge. This shear cutter 176 is mounted on a cross frame member 177 which is attached to the end standard 166. The upper face 178 of this cross member inclines downwardly so that the shear cutter can trim the rear edge of the sheet and the cut off strip will be discharged in the direction of the arrow $x$. When the advance edge of the sheet is placed over the stationary shear cutter 176 and trimmed, the trimmed off strip will be discharged in the direction of the arrow $y$. This cutting head operates, as noted above, to trim first the advance edge of the sheet, then to cut the sheet into blanks, and finally trim the rear edge of the sheet. The cutter head is moved up and down by a link 179 which is pivoted at 180 to the cutter, and this link cooperates with a crank 181 on a shaft 182. There are preferably two connecting links and cranks for operating the cutter head. Counterbalancing springs 183 are attached to the frame and to the cutter head and serve to aid in carrying the weight of the cutter head, so as to render the cutter head very easily operated.

The shaft 182 is rotated by a clutch connection with a driving pulley 184. Preferably, there is a clutch 185 between the driving pulley and the shaft 182. As shown in the drawings, this clutch is controlled by the usual clutch dog which in turn is operated by a control shaft 186. The control shaft is rocked by a link 187. The link 187 is connected through suitable devices with an arm 188 (see Fig. 7). This arm 188 is attached to a shaft 189 which carries a second arm 190 provided with a roller cooperating with a cam 191 indicated in dotted lines in Fig. 7. This cam is on the rear of the disk 58, and as this disk rotates, it will oscillate the shaft 189 and this will throw the clutch so as to reciprocate the head. This clutch might be omitted and the cutter head operated continuously, and the clutch for the side cutters so controlled as to operate said side cutters once for each sheet while the transverse cutter operates a plurality of times. In the present machine where the sheet is cut to form two blanks only, this cutter head will be reciprocated three times for the complete trimming of each sheet. The clutch, however, enables the driving mechanism for the cutter head to be timed so that the cutter will be operated very quickly when the shaft is connected thereto, and then will come to a dwell while the sheet is being positioned for the next cutting operation. By this quick reciprocation of the shear cutter blade, a very clean cut is obtained on the metal sheet.

The feed bars as they reciprocate carry the sheet to the position shown in broken lines at the right of Fig. 18. The sheet is then moved back against the gauges 165, 165 by the mechanism which includes a suction cup 192. The suction cup 192 is mounted in a sleeve 193 and is fixed to the sleeve. This sleeve is carried by parallel links 194, 194 which are pivoted at 195, 195, respectively, to a bracket 196 attached to a cross bar 197 carried by brackets 198, 198 attached to the frame of the machine. Mounted in this bracket 196 is a shaft 199. An arm 200 having a cam face 201 is adapted to engage a roller 202 on a projecting arm 203 carried by the sleeve on which the suction cup 192 is mounted. The shaft 199 also carries an arm 204 to which a link 205 is attached. This link is connected to a stud 206 which is adjustable in a slot 207 in the arm. A spring 208 is attached to the arm 203 and to a cross bar 209. This spring will move the sleeve 193 in a downward direction, holding the roller 202 in contact with the arm 200. When the link 205 is moved downward, then the cam 201 on the arm 200 will force the sleeve 193 to the left and upward. The swinging links 194 are so positioned that the suction cup moves downward into contact with the sheet, and then will move the sheet to the right a slight distance as viewed in Fig. 18. This is toward the rear of the machine. At this time, the suction cup moves from the dotted line position in Fig. 18 to the full line position therein, and this will cause the sheet to be moved back against the gauges 165 and positioned for trimming along the line a, a by the downward movement of the cutting blade 171. The suction cup is carried by a pipe which extends through the sleeve, and a flexible tube 210 attached to the upper end thereof is connected to a rotary valve 211 driven by a sprocket chain 212. The flexible tube 210 is connected at one side of the valve and a flexible tube 213 at the other side of the valve leads to a suitable suction creating means. This valve is of the usual construction and is timed so as to cut off the suction on the cup just before the feed dogs on the feed bars engage the sheet to move it forward. In other words, the suction cup remains holding the sheet against the gauges 165, while the sheet is trimmed along the line a, a, and this insures accurate trimming of the sheet.

The gauges 165 are mounted on a suspended longitudinal rail 214 located above the path of travel of the sheet (see Fig. 16). The rail is provided with a longitudinally extending T-shaped recess 215. Mounted in this recess and adjustable therein is a supporting block 216. Attached to the block 216 and longitudinally shiftable relative thereto is a head 217, and the gauge 165 is pivoted at 218 to this head (see Fig. 13). These gauges 165 are independently mounted, each on its own supporting overhead rail and they are independently adjustable thereon. An adjusting bolt 219 is provided for shifting the head so as to set the gauges with accuracy for the trimming of the sheet.

After the advance edge of the sheet has been trimmed, the suction on the cup, as noted above, is cut off, and dogs on each feed bar engage the sheet and move it forward so as to position the sheet for the cutting of the sheet along the line b, b (see Fig. 18). The forward edge of the sheet is used for positioning the sheet for this cutting operation. There are two gauging devices for positioning the sheet, one is indicated at 220 and the other at 221. They are similar in construction. These gauging devices are fixed to a rod 222. The rod 222 is mounted at its ends in brackets 223. Each bracket is carried by a sleeve 224 which has a threaded engagement with a supporting member 225. This provides a means whereby the rod 222 may be shifted to different set positions relative to the shear cutting blades. Each actuating device includes an arm 226 which is fixed to the rod 222. Supported by this arm 226 is a freely rotating shaft 227. Mounted on this shaft is a roller 228 which is located centrally between the side edges of the sheet. Cooperating with the roller 228 is a roller 229 preferably of rubber. The roller 229 is carried by a shaft 230 mounted in supporting rails 231. These rails are supported by the shafts 232 and 233. The shaft 232 is mounted in bearings in the frame, while the shaft 233 is mounted in brackets 234 also carried by the frame of the machine. A belt 235 runs over this shaft 233 and is driven thereby; it also runs over the pulley 236 attached to the roller 229 for rotating the same. The sheet as it is advanced by the feed dogs, has the edge thereof carried into gripping contact with these two rollers which move the sheet forward into the gauging devices. Mounted on the arm 226 is a bracket member 237. This bracket member 237 carries a gauge 238 having a front vertical flat face against which the edge of the sheet is placed for positioning the same for cutting the sheet. A link 239 is pivoted at 240 to this bracket member 237. The link at its other end has a threaded connection with a lug 241 projecting from a sleeve 242 which is clamped to the rod 222. This holds the gauge in a rigid position and at the same time permits it to be shifted to different set positions. Also mounted on the rod 222 at each gauging device is a lever 243. This lever has an upturned guiding foot 244 rigidly fixed thereto by a clamping bolt 245. The lever projects in rear of the rod 222 and carries a bolt 246 which projects through the arm 247 fixed to the rod 222. A spring 248 bearing against nuts 249 on the bolt, tends to turn the lever in a clockwise direction, forcing the gauging foot 244 downward to a position beneath the extreme lower edge of the gauge 238. A stop screw 250 limits the downward movement of this gauge foot. The sheet as it is moved forward, moves under the gauge foot 244. Mounted on the shaft 232 is a block 251. This shaft does not rotate, but the pulleys mounted on the shaft are free to rotate thereon. The block 251 carries an arm 252. There are two blocks and two arms, one at each gauging device. The shaft extends through its bearings and there is an arm 253 fixed to the end thereof. This arm 253 is provided with a slotted head and a link 255 is adjustably attached to said slotted head. The link 255 is in turn connected to a lever 256. The lever is pivoted at 257 and at its lower end carries a roller 258 cooperating with a cam on the shaft 24. This cam is so shaped and timed that the arms are raised against the lower side of the sheet as it approaches the gauges 238. This lifts the sheet so that it will contact with the gauges as clearly shown in Fig. 14, where the sheet is indicated at S. The sheet is shown as properly positioned for the cutter to operate thereon to sever the sheet along the line b, b. After the sheet is severed, then the arm 252 is lowered through the cam controlling the same operating to oscillate the shaft 232 in a counter-clockwise direction. This lowering of the arm permits the guide foot 244 to move downward through the action of the spring 248 and this strips the sheet from the gauges 238 and allows the cut blank to be discharged from the machine. The discharge of the blank is accomplished in part by the rollers 228 and 229, as the roller 229 is rotating rapidly and lightly and yieldingly contacting with the sheet. There are also conveyor belts 259. As shown, there are four of these conveyor belts running over pulleys which are fixed to the shaft 233 and which are loosely mounted on the shaft 232. The shaft 233 is rotated by a belt 260 which in turn runs over a pulley on the shaft 27. It will be noted that when the sheet is lifted by the arms 252 against the guide shoes, it will be gripped sufficiently to prevent any rearward movement of the sheet, and this will, together with the action of the roller 229 on the sheet, hold the sheet tight against the gauges during the cutting of the sheet.

After the first cut blank is discharged from the machine, then the feed dogs on the feed bars will engage the sheet and move the same forward for the next cutting operation. It will be understood that the machine may be adjusted for cutting more than two blanks from the sheet. This is easily accomplished, as the gauges for determining the positioning of the sheet after each cutting operation are very readily shifted. The mechanism for actuating the transverse cutter is independent of the means for operating the cutters for trimming the side edges of the sheet, and by suitable interchanging of transmission gears, the number of cutting operations of the transverse cutter to one cutting operation of the trimming devices for the side edges may be varied.

In the present machine, when the sheet is positioned for trimming along the line $c, c$, this cutting operation trims the rear edge of the sheet and forms the blank $B'$.

When the sheet is positioned for this last cutting and edge trimming operation, it is under the control of the feed dog $31^a$ at the forward end of the feed bar. This feed dog $31^a$ is pivoted at 261 to a bracket member 262 which is fixed to the end of the feed bar. There is, of course, a feed dog $31^a$ on each feed bar. A leaf spring 263 is attached to an arm depending from the bracket 262 and bears against a headed pin 264. This headed pin engages the feed dog $31^a$ below its pivotal support, and normally tends to raise the feed dog at the free end thereof. A stop pin 265 limits the upward movement of the feed dog. The feed dog has a forked forward end which engages the sheet. As the sheet is moved to bring the advance edge thereof against the gauges 238, the feed dog is free to move upward, if it contacts with a cross member supporting the lower shear blade or with the shear blade itself. The feed dogs $31^a$ hold the sheet until the presser bar 174 moves into gripping contact therewith, and then the feed bars and feed dogs are retracted, allowing the trimmed off strip to fall to the right of the lower shear blade, as indicated in Fig. 6, and be discharged from the machine.

It will be understood that while a sheet is being positioned for the trimming of the side edges thereof, another sheet which has had the side edges trimmed is being presented to the transverse shear cutter for performing the operations thereon which have been described above.

From the above it will be apparent that the machine described, while of great advantage in the forming of body blanks from the sheet whether it is decorated or not, is of particular value in the forming of blanks which are decorated in colors. When the sheet is decorated in the lithographing press it is gauged from the end thereof and a registering line is printed on the sheet adjacent said edge. The sheet is likewise gauged from one side and a registering line is printed on the sheet along said side. In subsequent printing operations these registering lines are kept in register and this brings about a proper registration of the colors. It is necessary to cut the body blank along lines having a predetermined relation to the printed decoration on the body blank. In this machine the same end and side which gauged the sheet for printing is used for placing and gauging the sheet for cutting.

In Fig. 18 of the drawings, the end $s^2$ is the end used for gauging the sheet and the registering line printed thereon is indicated at $w$—$w$. The side $s'$ is used for gauging the sheet for printing and the registering line thereon is indicated at $y$—$y$. When the sheet is presented to the parallel cutting devices, it is gauged from this end $s^2$ and the gauge 126 is adjusted so that the cutter adjacent thereto will cut the sheet parallel with the registering line $y$—$y$, preferably along said line. The cutter at the opposite side of the machine is spaced so as to cut bodies of the proper length and along a line parallel with the line $y$—$y$, the first named cutting line. The gauge 152 is yieldingly set so as to take care of varying widths of sheet.

When the sheet is presented to the transverse cutter for its initial cutting operation along the line $a$—$a$, it is gauged from the end of $s^2$, and the gauges are set so that the sheet will be cut along a line parallel to the registering line $w$—$w$, and at a distance therefrom determined by the number of units that are to be cut, and the decorations thereon. After the sheet has been cut along this line $a$—$a$, this trimmed edge is used as the basis for gauging the sheet for the next subsequent cutting operation. In other words, the advanced cut edge is placed against a gauge beyond the transverse cutting, and this positions the sheet so that the first unit will be severed from the sheet along a line parallel with the gauging edge, and also along a line in proper relation to the decorations on the units. The last formed cut edge then is used as a gauging edge for positioning the sheet for the next cutting operation, and so on, until all the units are cut from the sheet and the rear edge of the last unit of the sheet is trimmed.

It is understood that the gauges 31—31, which initially position the sheet for the trimming of the side edges thereof, are spaced the same distance as the gauges used in the lithograph press, or substantially so, and this insures the initial trimming of the sheet will be at right angles to the registration line $w$—$w$, irrespective of the normal irregularities in the edge of the printed sheet.

These same two gauging points are used for the positioning of the sheet for the first cutting operation of the transverse cutter. This transverse cutter is set in a line at right angles to the cutting lines of the parallel cutters, and this insures that the sheet when cut by the transverse cutter will produce units which, when finally cut, are rectangular.

It will be noted that there is a spring tension bar adjacent each cutting blade. These tension bars are on the inside of the parallel cutters so that the sheet will be first clamped by the tension bars and held under tension during the trimming of the side edges. This, together with the fact that the cutters are in the form of shear cutters and operated quickly, cuts the sheet without forming the usual objectionable burr that is produced by rotating cutters.

The machine readily adapts itself also for the cutting of a greater or less number of units from a sheet. This is accomplished by the operating of the transverse cutter through an independent mechanism from that which operates the parallel cutters, but timed therewith, and in the providing of a change gear mechanism which enables the number of strokes of the transverse cutter to be varied for each stroke of the parallel cutters.

It is obvious that many changes may be made in the details of construction and the arrangement of parts without departing from the spirit of the invention as set forth in the appended claims.

It is also obvious that the blanks which are cut from the sheets may be used for other purposes than the forming of can bodies and when a blank or unit is referred to, it is in the broad sense as meaning blanks of metal used for any purpose.

Having thus described the invention, what I claim as new and desire to secure by Letters-Patent, is—

1. A machine for forming metal blanks comprising sheet supporting devices, spaced parallel shear cutters, a transverse shear cutter spaced from said parallel cutters and extending from one cutting line to the other, and means for intermittently feeding and positioning the sheet for trimming the side edges thereof by the parallel cutters and for subsequently feeding and positioning the sheet, for trimming the advance edge, cutting said sheet into blanks, and trimming the rear edge of the last cut blank by said transverse cutter.

2. A machine for forming metal blanks comprising sheet supporting devices, spaced parallel shear cutters, a transverse shear cutter spaced from said parallel cutters and extending from one cutting line to the other, means for intermittently feeding and positioning the sheet for trimming the side edges thereof by the parallel cutters and for subsequently feeding and positioning the sheet, for trimming the advance edge, cutting said sheet into blanks, and trimming the rear edge of the last cut blank by said transverse cutter, and means associated with each shear cutter for clamping the metal prior to the cutting of the same.

3. A machine for forming metal blanks comprising sheet supporting devices, spaced parallel shear cutters, a transverse shear cutter spaced from said parallel cutters and extending from one cutting line to the other, means for intermittently feeding and positioning the sheet for trimming the side edges thereof by the parallel cutters and for subsequently feeding and positioning the sheet, for trimming the advance edge, cutting said sheet into blanks, and trimming the rear edge of the last cut blank by said transverse cutter, each shear cutter including a lower stationary cutting member and an upper reciprocating cutting member, and a yielding presser bar associated with each movable cutting member for clamping the sheet adjacent the cutting line prior to the cutting of the same.

4. A machine for forming metal blanks comprising sheet supporting devices, spaced parallel shear cutters, continuously moving conveyors having dogs for delivering a sheet to a position adjacent the parallel shear cutters, and reciprocating feed bars for engaging the sheet delivered by the conveyors for moving the same forward out of engagement with the dogs to a set position for the parallel shear cutters, said conveyor dogs operating to again engage the sheets and move the same away from the cutters after the side edges have been trimmed thereby.

5. A machine for forming metal blanks comprising sheet supporting devices, spaced parallel shear cutters, continuously moving conveyors having dogs for deliverying a sheet to a position adjacent the parallel shear cutters, and reciprocating feed bars for engaging the sheet delivered by the conveyors for moving the same forward out of engagement with the dogs to a set position for the parallel shear cutters, said conveyor dogs operating to again engage the sheets and move the same away from the cutters after the side edges have been trimmed thereby, and gauging devices movable into engagement with the side edges of the sheet for positioning the sheet for cutting.

6. A machine for forming metal blanks comprising sheet supporting devices, spaced parallel shear cutters, continuously moving conveyors having dogs for delivering a sheet to a position adjacent the parallel shear cutters, reciprocating feed bars for engaging the sheet delivered by the conveyors for moving the same forward out of engagement with the dogs to a set position for the parallel shear cutters, said conveyor dogs operating to again engage the sheets and move the same away from the cutters after the side edges have been trimmed thereby, and gauging devices movable into engagement with the side edges of the sheet for positioning the sheet for cutting, one of said gauging devices being moved to a positive set position, and the other yielding to accommodate varying widths of sheets.

7. A machine for forming metal blanks comprising sheet supporting devices, spaced parallel shear cutters, continuously moving conveyors having dogs for delivering a sheet to a position adjacent the parallel shear cutters, reciprocating feed bars for engaging the sheet delivered by the conveyors for moving the same forward out of engagement with the dogs to a set position for the parallel shear cutters, said conveyor dogs operating to again engage the sheets and move the same away from the cutters after the side edges have been trimmed thereby, and gauging devices movable into engagement with the side edges of the sheet for positioning the sheet for cutting, one of said gauging devices having an adjustable abutment movable with the gauging device for determining the set position thereof, and the other gauging device being yielding to accommodate sheets of varying widths.

8. A machine for forming metal blanks comprising sheet supporting devices, spaced parallel shear cutters, continuously moving conveyors having dogs for delivering a sheet to a position adjacent the parallel shear cutters, reciprocating feed bars for engaging the sheet delivered by the conveyors for moving the same forward out of engagement with the dogs to a set position for the parallel shear cutters, said conveyor dogs operating to again engage the sheets and move the same away from the cutters after the side edges have been trimmed thereby, and gauging devices movable into engagement with the side edges of the sheet for positioning the sheet for cutting, one of said gauging devices including a sleeve having means contacting with the edge of the sheet, a reciprocating sleeve telescoping the first-named sleeve and carrying an adjustable abutment, a cross bar carried by said first-named sleeve and adapted to engage said abutment, a spring for moving said cross bar into engagement with the abutment, and means for shifting said gauging device to a set gauging position.

9. A machine for forming metal blanks comprising sheet supporting devices, spaced parallel shear cutters, continuously moving conveyors having dogs for delivering a sheet to a position adjacent the parallel shear cutters, reciprocating feed bars for engaging the sheet delivered by the conveyors for moving the same forward out of engagement with the dogs to a set position for the parallel shear cutters, said conveyor dogs operating to again engage the sheets and move the same away from the cutters after the side edges have been trimmed thereby, gauging devices movable into engagement with the side edges of the sheet for positioning the sheet for cutting, and means associated with each gauging device for moving the same for gauging the sheet and for retracting the gauging devices prior to the operation of the shear cutters.

10. A machine for forming metal blanks comprising sheet supporting devices, spaced parallel shear cutters, continuously moving conveyors having dogs for delivering a sheet to a position adjacent the parallel shear cutters, reciprocating feed bars for engaging the sheet delivered by the conveyors for moving the same forward out of engagement with the dogs to a set position for the parallel shear cutters, said conveyor dogs operating to again engage the sheets and move the same away from the cutters after the side edges have been trimmed thereby, gauging devices movable into engagement with the side edges of the sheet for positioning the sheet for cutting, means associated with each gauging device for moving the same for gauging the sheet and for retracting the gauging devices prior to the operation of the shear cutters, and a yielding frame member resting on said sheet for holding the sheet in a set position.

11. A machine for forming metal blanks comprising sheet supporting devices, spaced parallel shear cutters, continuously moving conveyors having dogs for delivering a sheet to a position adjacent the parallel shear cutters, reciprocating feed bars for engaging the sheet delivered by the conveyors for moving the same forward out of engagement with the dogs to a set position for the parallel shear cutters, said conveyor dogs operating to again engage the sheets and move the same away from the cutters after the side edges have been trimmed thereby, gauging devices movable into engagement with the side edges of the sheet for positioning the sheet for cutting, means associated with each gauging device for moving the same for gauging the sheet and for retracting the gauging devices prior to the operation of the shear cutters, same means for moving the gauging devices including a cam for moving said devices to gauging position, a spring for retracting the same, and means engaged by one of the descending shear cutters for forcibly retracting the gauges when the spring is ineffective to retract the gauges.

12. A machine for forming metal blanks comprising sheet supporting devices, spaced parallel shear cutters, a transverse shear cutter spaced from said parallel cutters and extending from one cutting line to the other, means for intermittently feeding and positioning the sheet for trimming the side edges thereof by the parallel cutters and for subsequently feeding and positioning the sheet, for trimming the advance edge, cutting said sheet into blanks, and trimming the rear edge of the last cut blank by said transverse cutter, means for operating said shear cutters from a common source of power including a continuously rotating driving member for operating the parallel shear cutters, a clutch for connecting said driving member to the shear cutters for operating the same, and a cam for controlling said clutch whereby said parallel shear cutters are operated once for several reciprocations of the transverse shear cutter.

13. A machine for forming metal blanks comprising sheet supporting devices, spaced parallel shear cutters, a transverse shear cutter spaced from said parallel cutters and extending from one cutting line to the other, means for intermittently feeding and positioning the sheet for trimming the side edges thereof by the parallel cutters and for subsequently feeding and positioning the sheet, for trimming the advance edge, cutting said sheet into blanks, and trimming the rear edge of the last cut blank by said transverse cutter, means for operating said shear cutters from a common source of power including a continuously rotating driving member for operating the parallel shear cutters, a clutch for connecting said driving member to the shear cutters for operating the same, a cam for controlling said clutch whereby said parallel shear cutters are operated once for several reciprocations of the transverse shear cutter, a continuously driven member for the transverse shear cutter, a clutch for connecting the same to the shear cutter, and a cam for controlling said clutch whereby said shear cutter may be connected to said driven member and quickly reciprocated for cutting the sheet.

14. A machine for forming metal blanks comprising sheet supporting devices, spaced parallel shear cutters, a transverse shear cutter spaced from said parallel cutters and extending from one cutting line to the other, means for intermittently feeding and positioning the sheet for trimming the side edges thereof by the parallel cutters and for subsequently feeding and positioning the sheet, for trimming the advance edge, cutting said sheet into blanks, and trimming the rear edge of the last cut blank by said transverse cutter, means for operating said shear cutters from a common source of power including a continuously rotating driving member for operating the parallel shear cutters, a clutch for connecting said driving member to the shear cutters for operating the same, a cam for controlling said clutch whereby said parallel shear cutters are operated once for several reciprocations of the transverse shear cutter, a continuously driven member for the transverse shear cutter, a clutch for connecting the same to the shear cutter, a cam for controlling said clutch whereby said shear cutter may be connected to said driven member and quickly reciprocated for cutting the sheet, and means independent of the driving means for the shear cutters for operating the feeding means.

15. A machine for forming metal blanks comprising sheet supporting devices, a shear cutter extending transversely thereof, reciprocating feed bars for feeding the sheet to said shear cutter, adjustable gauges for contacting with the rear edge of the sheet for positioning the same for trimming the advance edge of the sheet, a suction cup, supporting arms carrying the suction cup and disposed so as to move the suction cup into contact with the sheet and shift the sheet rearwardly against the gauges, means for moving said arms, and a control valve for controlling the suction on the cup whereby the suction cup holds the sheet positioned for trimming and releases the sheet so that it may be advanced for the next cutting operation.

16. A machine for forming metal blanks comprising sheet supporting devices, a shear cutter extending transversely thereof, reciprocating feed bars for feeding the sheet to said shear cutter, adjustable gauges for contacting with the rear edge of the sheet for positioning the same for trimming the advance edge of the sheet, gauging devices contacting with the advance cut edge of the sheet for positioning the same for the cutting of the blanks from the sheet, and means contacting with the sheet delivered to the shear cutter by the feed bars for retracting the same against the first-named gauge members, said feed bars having means for advancing the sheet into contact with the last-named gauge members.

17. A machine for forming metal blanks comprising sheet supporting devices, a shear cutter extending transversely thereof, reciprocating feed bars for feeding the sheet to said shear cutter, adjustable gauges for contacting with the rear edge of the sheet for positioning the same for trimming the advance edge of the sheet, gauging devices contacting with the advance cut edge of the sheet for positioning the same for the cutting of the blanks from the sheet, means contacting with the sheet delivered to the shear cutter by the feed bars for retracting the same against the first-named gauge members, said feed bars having means for advancing the sheet into contact with the last-named gauge members, said last-named gauge members including yielding members for clamping the sheet and holding the same in contact with the gauges, and means for stripping the sheet from the gauges after the blank has been cut.

18. A machine for forming metal blanks comprising sheet supporting devices, a shear cutter extending transversely thereof, reciprocating feed bars for feeding the sheet to said shear cutter, adjustable gauges for contacting with the rear edge of the sheet for positioning the same for trimming the advance edge of the sheet, gauging devices contacting with the advance cut edge of the sheet for positioning the same for the cutting of the blanks from the sheet, means contacting with the sheet delivered to the shear cutter by the feed bars for retracting the same against the first-named gauge members, said feed bars having means for advancing the sheet into contact with the last-named gauge members, said last-named gauge members including yielding members for clamping the sheet and holding the same in contact with the gauges, means for stripping the sheet from the gauges after the blank has been cut, and conveying means for receiving and conveying the cut blank from the shear cutter.

19. A machine for forming metal blanks comprising sheet supporting devices, spaced parallel shear cutters, a transverse shear cutter spaced from said parallel cutters and extending from one cutting line to another and at right angles thereto, means for intermittently feeding the sheets to the cutters, gauging devices movable into engagement with the sheet for positioning the sheet for cutting, one of said gauging devices being moved to a positive set position and the other yielding to accommodate varying widths of sheet so that it is cut along lines parallel with the registering lines formed along the side edges of the sheet during the decorating thereof, gauging means associated with said transverse cutter whereby said sheet is cut along lines parallel with the registering line at the gauging end of the sheet and at right angles to the first cutting lines and properly positioned relative to the decorations on the sheet.

JOHN COYLE.